(12) United States Patent
Hori et al.

(10) Patent No.: US 10,834,146 B2
(45) Date of Patent: Nov. 10, 2020

(54) TERMINAL, BASE STATION, AND CODEC MODE SWITCHING METHOD

(71) Applicant: Panasonic Intellectual Property Corporation of America, Torrance, CA (US)

(72) Inventors: Takako Hori, Kanagawa (JP); Prateek Basu Mallick, Hessen (DE); Hidetoshi Suzuki, Kanagawa (JP); Ayako Horiuchi, Kanagawa (JP); Joachim Loehr, Hessen (DE)

(73) Assignee: Panasonic Intellectual Property Corporation of America, Torrance, CA (US)

(*) Notice: Subject to any disclaimer, the term of this patent is extended or adjusted under 35 U.S.C. 154(b) by 90 days.

(21) Appl. No.: 16/125,018

(22) Filed: Sep. 7, 2018

(65) Prior Publication Data

US 2019/0007464 A1    Jan. 3, 2019

Related U.S. Application Data

(63) Continuation of application No. PCT/JP2017/003779, filed on Feb. 2, 2017.

(30) Foreign Application Priority Data

Mar. 28, 2016  (JP) .................................. 2016-064107
May 12, 2016  (JP) .................................. 2016-095935

(51) Int. Cl.
*H04W 72/08*  (2009.01)
*H04L 29/06*  (2006.01)
(Continued)

(52) U.S. Cl.
CPC ........ *H04L 65/1069* (2013.01); *H04L 65/105* (2013.01); *H04L 65/1046* (2013.01);
(Continued)

(58) Field of Classification Search
None
See application file for complete search history.

(56) References Cited

U.S. PATENT DOCUMENTS

2001/0053971 A1   12/2001   Demetrescu et al.
2004/0047437 A1   3/2004    Hamiti et al.
(Continued)

FOREIGN PATENT DOCUMENTS

EP   2640052 A1      9/2013
JP   2009-533967 A   9/2009
(Continued)

OTHER PUBLICATIONS

International Search Report of PCT application No. PCT/JP2017/003779 dated Apr. 11, 2017.
(Continued)

*Primary Examiner* — Brandon M Renner
(74) *Attorney, Agent, or Firm* — Seed IP Law Group LLP

(57) ABSTRACT

A UE includes an EUTRA-CMR reception unit that receives a codec mode request (EUTRA-CMR) including a codec mode that is determined by an eNB in accordance with a radio condition of the UE, a mode switching notification unit that notifies an encoder of switching to the codec mode included in the received codec mode request; and a mode switching acknowledgement unit that transmits a response message to the eNB when confirming that the encoder switches the codec mode.

19 Claims, 19 Drawing Sheets

(51) Int. Cl.
H04W 80/10 (2009.01)
G10L 19/22 (2013.01)
H04W 84/04 (2009.01)

(52) U.S. Cl.
CPC .......... H04L 65/607 (2013.01); H04L 65/608 (2013.01); H04W 80/10 (2013.01); G10L 19/22 (2013.01); H04W 84/042 (2013.01)

(56) References Cited

U.S. PATENT DOCUMENTS

| | | | | |
|---|---|---|---|---|
| 2004/0267519 | A1* | 12/2004 | Sjoberg | H04L 1/0014 704/201 |
| 2007/0025324 | A1* | 2/2007 | Kim | H04L 29/06027 370/349 |
| 2007/0223469 | A1 | 9/2007 | Chandra et al. | |
| 2008/0013528 | A1 | 1/2008 | Miller et al. | |
| 2008/0025300 | A1* | 1/2008 | Lide | H04L 29/06027 370/389 |
| 2010/0017509 | A1* | 1/2010 | Frankkila | H04M 7/006 709/224 |
| 2010/0279701 | A1* | 11/2010 | Chen | H04L 1/20 455/452.2 |
| 2010/0284278 | A1 | 11/2010 | Alanara | |
| 2011/0075563 | A1 | 3/2011 | Leung et al. | |
| 2012/0106451 | A1* | 5/2012 | Enstrom | H04W 36/385 370/328 |
| 2012/0239386 | A1* | 9/2012 | Peng | H04L 1/0014 704/201 |
| 2013/0230057 | A1* | 9/2013 | Hori | H04L 69/22 370/466 |
| 2015/0092575 | A1 | 4/2015 | Khay-Ibbat et al. | |
| 2019/0037001 | A1* | 1/2019 | Fujishiro | H04W 74/0833 |

FOREIGN PATENT DOCUMENTS

WO 2007/121163 A1 10/2007
WO 2012/063417 A1 5/2012

OTHER PUBLICATIONS

3GPP TS 23.228 V13.4.0, "IP Multimedia Subsystem (IMS); Stage 2 (Release 13)", Sep. 2015.
3GPP TS 26.445 V13.0.0, "Codec for Enhanced Voice Services (EVS); Detailed algorithmic description", Feb. 2016.
IETF RFC 4867, "RTP Payload Format and File Storage Format for the Adaptive Multi-Rate (AMR) and Adaptive Multi Rate Wideband (AMR-WB) Audio Codecs", Apr. 2007.
3GPP TS 26.114 V131.0, "IP Multimedia Subsystem (IMS); Multimedia telephony; Media handling and interaction", Jan. 2016.
3GPP TS 23.401 V13.5.0, "General Packet Radio Service (GPRS) enhancements for Evolved Universal Terrestrial Radio Access Network (E-UTRAN) access (Release 13)", Dec. 2015.
IETF RFC 3168, "The Addition of Explicit Congestion Notification (ECN) to IP", Sep. 2001.
3GPP TS 36300 V13.2.0, "Evolved Universal Terrestrial Radio Access (E-UTRA) and Evolved Universal Terrestrial Radio Access Network (E-UTRAN); Overall description; Stage 2 (Release 13)", Dec. 2015.
3GPP TS 36321 V13.0.0, "Evolved Universal Terrestrial Radio Access (E-UTRA); Medium Access Control (MAC) protocol specification", Feb. 2016.
3GPP TS 36331 V13.0.0, "Evolved Universal Terrestrial Radio Access (E-UTRA); Radio Resource Control (RRC); Protocol specification", Jan. 2016.
3GPP TS 36.213 V13.0.0, "Evolved Universal Terrestrial Radio Access (E-UTRA); Physical layer procedures (Release 13)", Dec. 2015.
The Extended European Search Report dated Jan. 18, 2019 for the related European Patent Application No. 17773639.4.
Panasonic: "Codec Mode Selection", 3GPP Draft; R2-165105 Codecmodeselection, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 22, 2016-Aug. 26, 2016 Aug. 12, 2016 (Aug. 12, 2016), XP051133726, Retrieved from the Internet: URL:http://www.3gpp.org/ftp/tsg_ran/WG2_RL2/TSGR2_95/Docs/ [retrieved on Aug. 12, 2016].
Colombian Examiner's Opinion dated May 28, 2019 for the related Colombian Patent Application No. NC2018/0009997.
English Translation of Russian Search Report dated Apr. 14, 2020 for the related Russian Patent Application No. 2018133703, 2 pages.
Communication pursuant to Article 94(3) EPC dated Jun. 8, 2020 for the related European Patent Application No. 17773639.4, 5 pages.

* cited by examiner

FIG. 3

| SDP OFFER |
|---|
| m=audio 49152 RTP/AVP 97 98 99<br>a=tcap:1 RTP/AVPF<br>a=pcfg:1 t=1<br>b=RS:0<br>b=RR:4000<br>a=rtpmap:97 EVS/16000/1<br>a=fmtp:97 br=7.2-13.2; bw=nb-swb; max-red=220<br>a=rtpmap:98 AMR-WB/16000/1<br>a=fmtp:98 mode-change-capability=2; max-red=220<br>a=rtpmap:99 AMR/8000/1<br>a=fmtp:99 mode-change-capability=2; max-red=220<br>a=ptime:20<br>a=maxptime:240 |

| SDP ANSWER |
|---|
| m=audio 49152 RTP/AVPF 97<br>a=acfg:1 t=1<br>b=AS:30<br>b=RS:0<br>b=RR:2000<br>a=rtpmap:97 EVS/16000/1<br>a=fmtp:97 br=7.2-13.2; bw=nb-swb; max-red=220<br>a=ptime:20<br>a=maxptime:240 |

| | | | OPERATOR k |
|---|---|---|---|
| INDEX | CODEC | | ... |
| 1 | EVS | br=9.6-24.4; bw=swb; hf-only=1; ch-aw-recv=-1 | ... |
| 2 | EVS | br=7.2-13.2; bw=nb-swb; ch-aw-recv=-1 | ... |
| 3 | AMR-WB | octet-align=1 | ... |
| 4 | AMR-WB | | ... |
| ... | ... | ... | ... |

VALUES OF LCID FOR DL-SCH

| INDEX | LCID VALUES |
|---|---|
| 00000 | CCCH |
| 00001-01010 | Identity of the logical channel |
| 01011-11000 | Reserved |
| 11001 | EUTRA-CMR |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

EUTRA-CMR

VALUES OF CODEC

| INDEX | CODEC |
|---|---|
| 000 | AMR |
| 001 | AMR-WB, EVS AMR-WB IO |
| 010 | EVS-NB |
| 011 | EVS-WB |
| 100 | EVS-SWB |
| 101 | EVS-FB |
| 110 | EVS-CA-WB |
| 111 | EVS-CA-SWB |

VALUES OF LCID FOR DL-SCH

| INDEX | LCID VALUES |
|---|---|
| 00000 | CCCH |
| 00001-01010 | Identity of the logical channel |
| 01011-10111 | Reserved |
| 11000 | Short EUTRA-CMR |
| 11001 | Long EUTRA-CMR |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

VALUES OF CODEC

| INDEX | CODEC |
|---|---|
| 000 | AMR |
| 001 | AMR-WB |
| 010 | EVS |
| 011-111 | Reserved |

FIG. 15

| INDEX | DATA SIZE (bits) PER FRAME (20 msec) |
|---|---|
| 0 | 0 TO 112 |
| 1 | 113 TO 144 |
| 2 | 145 TO 160 |
| 3 | 161 TO 192 |
| 4 | 193 TO 264 |
| 5 | 265 TO 328 |
| 6 | 329 TO 488 |
| 7 | 489 TO 640 |
| 8 | 641 TO 960 |
| 9 | 961 TO 1280 |
| 10 | 1281 TO 1920 |
| 11 | 1921 TO 2560 |
| 12 | 2561 OR MORE |

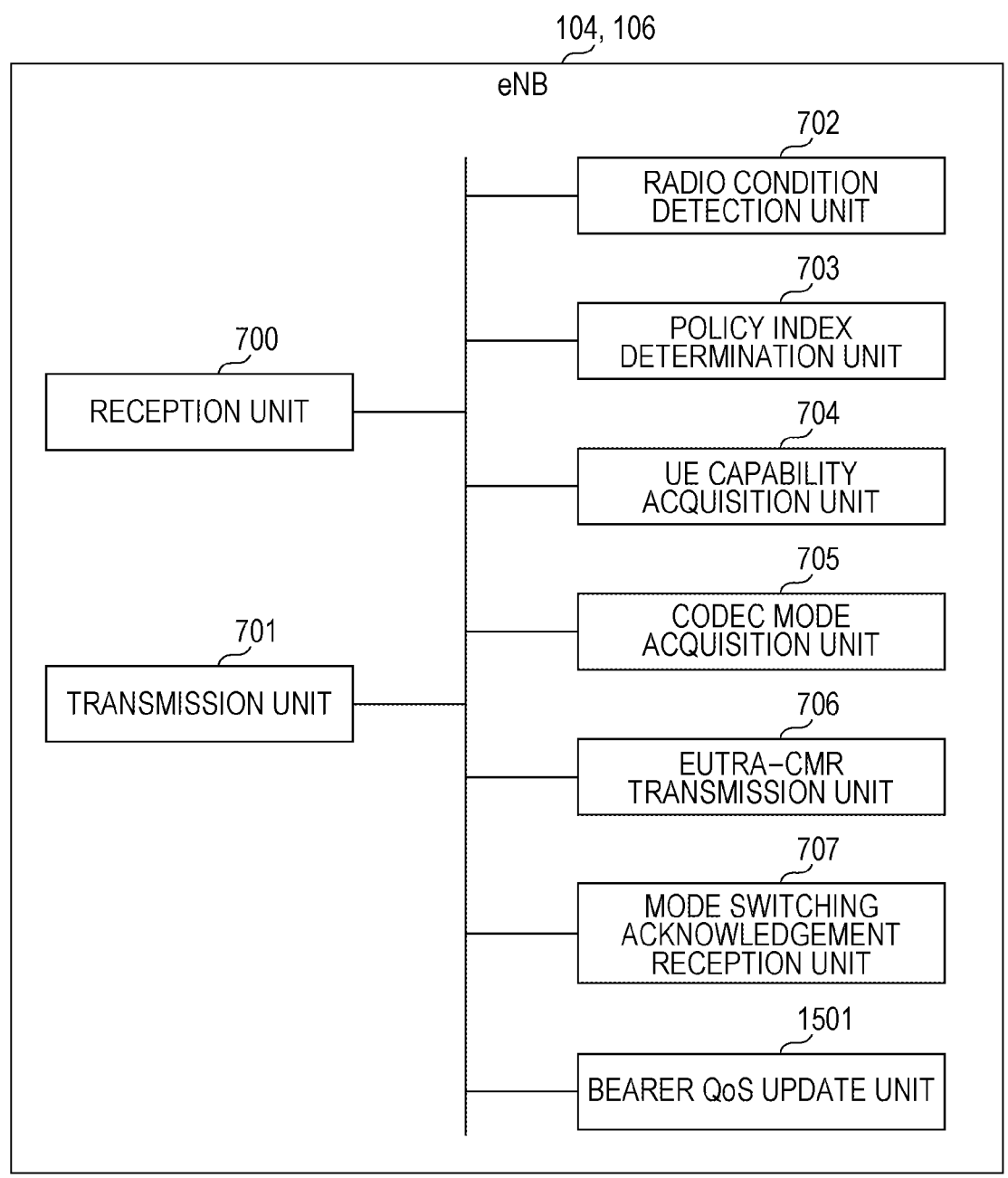

VALUES OF LCID FOR DL-SCH

| INDEX | LCID VALUES |
|---|---|
| 00000 | CCCH |
| 00001-01010 | Identity of the logical channel |
| 01011-11000 | Reserved |
| 11001 | EUTRA-CMR |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

EUTRA-CMR

TERMINAL, BASE STATION, AND CODEC MODE SWITCHING METHOD

BACKGROUND

1. Technical Field

The present disclosure relates to a terminal, a base station, and a codec mode switching method for switching a codec mode in accordance with congestion of a radio access network to which the terminal is to connect (radio access network) or in accordance with a radio environment of each terminal.

2. Description of the Related Art

In the Third Generation Partnership Project (3GPP), Voice over Long Term Evolution (VoLTE) has been standardized which is a Voice over IP (VoIP) service using an IP Multimedia Subsystem (IMS) in an LTE network.

FIG. 1 illustrates an example of a 3GPP's network configuration of the VoLTE service using the IMS. The network illustrated in FIG. 1 includes an IMS network 128, IP core networks (EPCs: Evolved Packet Cores) 124, 126 of operators, base stations (eNBs: e Node Bs) 104, 106, and radio access networks (E-UTRANs: evolved Universal Terrestrial Radio Access Networks) 120, 122 configured under the control of the eNBs.

In FIG. 1, terminals (UEs: User Equipments) 100, 102 wirelessly connect to the eNBs 104, 106 through the E-UTRANs 120, 122 respectively, and connect to the EPCs 124, 126 via the eNBs 104, 106.

The IMS network 128 is a network for managing information for call control, for routing a signaling message (SIP: Session Initiation Protocol) of call control, and for making interconnection with the 3GPP network or a network other than 3GPP.

In the IMS network 128 illustrated in FIG. 1, Proxy Call Session Control Functions (P-CSCFs) 108, 116 are CSCFs that serve as default gateways when the UEs 100, 102 transmit and receive an IMS signaling message (SIP REGISTER message, SIP INVITE message, or the like). Which P-CSCF is used by each UE is determined by search when, for example, the UE connects to the EPC for the first time.

Serving CSCFs (S-CSCFs) 110, 114 are CSCFs that manage contact information on the UEs 100, 102 and also manage their sessions. When managing the contact information on the UEs 100, 102, the S-CSCFs 110, 114 download necessary information from a home subscriber server (HSS) 118.

Interrogating CSCF (I-CSCF) 112 retains information on CSCFs between management domains (units of networks managed by the operators). For example, when the P-CSCFs 108, 116 and the S-CSCFs 110, 114 have no information on the next node to which the IMS signaling message should be transferred, the IMS signaling message is transferred by way of the I-CSCF 112. The I-CSCF 112 may also confirm the information on a CSCF as a transfer destination of the message by interrogating the HSS 118 on the information. Hereinafter, for example, a case of transmitting the SIP INVITE message is described.

First, the SIP INVITE message is transmitted from a caller-side UE to the P-CSCF of a domain in which that UE exists (caller-side domain) by way of the EPC and then transferred from the P-CSCF to the S-CSCF of the caller-side domain. After properly processing the SIP INVITE message, the S-CSCF of the caller-side domain transfers the SIP INVITE message to the S-CFCS of a domain in which a called-side UE exists (called-side domain). At this point, the SIP INVITE message may be transferred by way of the I-CSCF 112. The S-CSCF of the called-side domain transfers the received SIP INVITE message to the called-side UE by way of the P-CSCF of the called-side domain.

Note that detailed configuration, function, operation, and the like of the IMS network 128 are described in 3GPP TS 23.228 v13.4.0, "IP Multimedia Subsystem (IMS); Stage 2."

FIG. 2 is a flow presenting an example of a 3GPP's procedure before and at the start of a VoLTE talk using the IMS. FIG. 2 illustrates a flow example of a case where the UE 100 makes a phone call to the UE 102. As illustrated in FIG. 2, the SIP INVITE message is transmitted from the UE 100 to the UE 102 through the IMS network 128 (step (hereinafter called "ST") 11), and a SIP 183 Session Progress message is transmitted from the UE 102 to the UE 100 through the IMS network 128 (ST12). The SIP INVITE message and the SIP 183 Session Progress message are exchanged between the UEs like this to negotiate the call.

In Session Description Protocol (SDP) offer added to the SIP INVITE message, multiple combinations (or one combination in some cases) of parameters that the UE 100 can use in the VoLTE communications (hereinafter the combination is stated as "mechanism") are described in the priority order. The parameters described in the SDP offer are candidates for a codec method or a codec mode and a transport protocol format, for example. The codec method or the codec mode includes elements employed as a codec such as a bitrate, an audio band (unit is Hz: Hertz), and the number of channels. The transport protocol format includes a type of Real-time Transport Protocol (RTP) payload format, for example.

Once receiving the SIP INVITE message in ST 11, the UE 102 selects one mechanism from the multiple candidates described in the SDP offer or changes one mechanism within the allowable range, and describes it in SDP answer. The UE 102 adds the SDP answer to the SIP 183 Session Progress message and transmits it to the UE 100 (ST12).

The P-CSCFs 108, 116 in the IMS network 128 analyze the mechanism selected by the UE 102, and output, to the EPCs 124, 126, an instruction to establish a logical data route (bearer) supporting the required Quality of Service (QoS) in accordance with the analysis result. According to the instruction from the IMS network 128, a bearer is established in the EPCs 124, 126 and the E-UTRANs 120, 122, and QoS controls over this bearer (resource allocation processing and the like) are executed (ST13). Once the bearer establishment is completed, the UE 102 calls the user (ST14). Once the user responses, a 200OK message is transmitted to the UE 100 (ST15), and then the UE 100 and the UE 102 start to talk (ST16).

Note that also the IMS signaling is transmitted and received using a dedicated bearer established for the IMS signaling.

FIG. 3 illustrates an example of the SDP offer and the SDP answer. In FIG. 3, in the SDP offer, the UE 100 offers three mechanisms including: a mechanism of an Enhanced Voice Services (EVS) codec in which a bitrate is between 7.2 kbps and 13.2 kbps and an audio band is from Narrowband (NB) to Super Wideband (SWB) (RTP payload format is default) (lines having "97" in FIG. 3); a mechanism of an Adaptive Multi Rate-WideBand (AMR-WB) codec (RTP payload format is default) (lines having "98" in FIG. 3); and a mechanism of an AMR codec (RTP payload format is default) (lines having "99" in FIG. 3). Meanwhile, the UE 102 selects the EVS codec in the SDP answer.

In this case, there are audio bands (or audio band widths) referred to as Narrowband, Wideband, Super Wideband, and Fullband in the conventional technique. The narrowband codec is a codec that is generally in a bandwidth between 300 Hz and 3.4 kHz and performs sampling at 8 kHz. The wideband codec is a codec that is generally in a bandwidth between 50 Hz and 7 kHz and performs sampling at 16 kHz. The super wideband codec is a codec that is generally in a bandwidth between 50 Hz and 14 kHz and performs sampling at 32 kHz. The fullband codec is a codec that is generally in a bandwidth between 20 Hz and 20 kHz and performs sampling at 48 kHz. Note that, when a line including a mechanism not supported by the IMS network 128 is detected from the SDP offer, the P-CSCFs 108, 116 in the IMS network 128 delete that line. For example, when the EVS codec is not supported by the IMS network 128, the P-CSCFs 108, 116 delete the lines having "97" in the SDP offer illustrated in FIG. 3.

Note that the parameters used in the SDP offer/answer of the EVS codec and the parameters used in the SDP offer/answer of the AMR-WB codec and the AMR codec are described in 3GPP TS 26.445 v13.0.0, "Codec for Enhanced Voice Services (EVS); Detailed algorithmic description" and IETF RFC 4867, "RTP Payload Format and File Storage Format for the Adaptive Multi-Rate (AMR) and Adaptive Multi-Rate Wideband (AMR-WB) Audio Codecs," respectively. Examples of the SDP offer and the SDP answer are described in 3GPP TS 26.114 v13.2.0, "IP Multimedia Subsystem (IMS); Multimedia Telephony; Media handling and interaction."

FIG. 4 illustrates a configuration of the EPCs 124, 126 illustrated in FIG. 1. Note that the eNBs 104, 106 and the HSS 118 illustrated in FIG. 4 are just like those described in FIG. 1. A Mobility Management Entity (MME) manages location information and others of the UE and also retains a part of information on each UE that the HSS 118 has. Serving GateWay (S-GW) and Packet Data Network GateWay (P-GW) manage a logical route (bearer) used by each UE for data transfer and cooperate with a later-described Policy and Charging Rules Function (PCRF) to give QoS guarantee on the bearer if necessary. The PCRF is a node that manages charge or the QoS guarantee on a service used by each UE. Note that, as described above, the P-CSCFs 108, 116 in the IMS network 128 may check the description in the SDP offer/answer, and in some cases notify the PCRF of the QoS information based on the negotiated codec and codec mode information.

Detailed configuration, function, operation, and the like of the EPCs 124, 126 are described in 3GPP TS 23.401 v13.5.0, "General Packet Radio Service (GPRS) enhancements for Evolved Universal Terrestrial Radio Access Network (E-UTRAN) access."

Once the UEs start to talk after the negotiation of the codec or the codec mode is completed, any one of the UEs can adjust the bitrate (data size) transmitted from the other UE on the phone by requesting the other UE to change the codec mode (bitrate and the like) within the negotiated range by use of a Codec Mode Request (CMR) field or a CMR byte in the RTP payload format of the negotiated codec (e.g., see IETF RFC 4867, "RTP Payload Format and File Storage Format for the Adaptive Multi-Rate (AMR) and Adaptive Multi-Rate Wideband (AMR-WB) Audio Codecs") (e.g., see 3GPP TS 26.445 v13.0.0, "Codec for Enhanced Voice Services (EVS); Detailed algorithmic description"), or use of a CMR of an Application-defined RTCP packet (RTCP-APP) (e.g., see 3GPP TS 26.114 v13.2.0, "IP Multimedia Subsystem (IMS); Multimedia Telephony; Media handling and interaction").

FIG. 5 illustrates an example of the bitrate change using the CMR. A UE 1 and a UE 2 illustrated in FIG. 5 are talking by using AMR-WB codec 12.65 kbps. In FIG. 5(1), the UE 1 transmits to the UE 2 a CMR for instructing the UE 2 to change the bitrate to AMR-WB 8.85 kbps. In FIG. 5(2), once receiving the CMR, the UE 2 changes the bitrate to AMR-WB 8.85 to continue talking.

Note that, as described in 3GPP TS 26.114 v13.2.0, "IP Multimedia Subsystem (IMS); Multimedia Telephony; Media handling and interaction," the CMR may be transmitted from a network node such as Media GateWay (MGW). The MGW is a network node that enables a call between a UE in the VoLTE service area and a terminal outside the VoLTE service area (including a terminal in a 3G circuit switched network, a fixed network, or the like) (not illustrated in FIGS. 1 and 4).

SUMMARY

An appropriate codec or codec mode is different depending on variation of a radio condition in UTRAN of each UE. However, in the conventional technique, there has been no sufficient consideration on a method of changing a codec or codec mode in accordance with a radio condition of the UE.

One non-limiting exemplary embodiment provides a terminal, a base station, and a codec mode switching method for appropriately switching a codec or a codec mode in accordance with a radio condition of a UE.

In one general aspect, the techniques disclosed here feature a terminal according to an aspect of the present disclosure adopts a configuration including: a codec mode request reception unit that receives a codec mode request including a codec mode that is determined by a base station in accordance with a radio condition of the terminal; a mode switching notification unit that notifies an encoder of switching to the codec mode included in the received codec mode request; and a mode switching acknowledgement unit that transmits a response message to the base station when acknowledging that the encoder switches the codec mode.

According to an aspect of the present disclosure, it is possible to appropriately switch a codec or a codec mode in accordance with a radio condition of a UE.

It should be noted that general or specific embodiments may be implemented as a system, a device, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram that illustrates an example of SDP offer and SDP answer;

FIG. 15 is a diagram that illustrates a correspondence relation between a data size range and an index according to Embodiment 2 of the present disclosure;

FIG. 16 is a block diagram that illustrates an example of a configuration of a base station (eNB) according to Embodiment 2 of the present disclosure;

DETAILED DESCRIPTION

[Background of Aspect of Present Disclosure]

Figure 1:
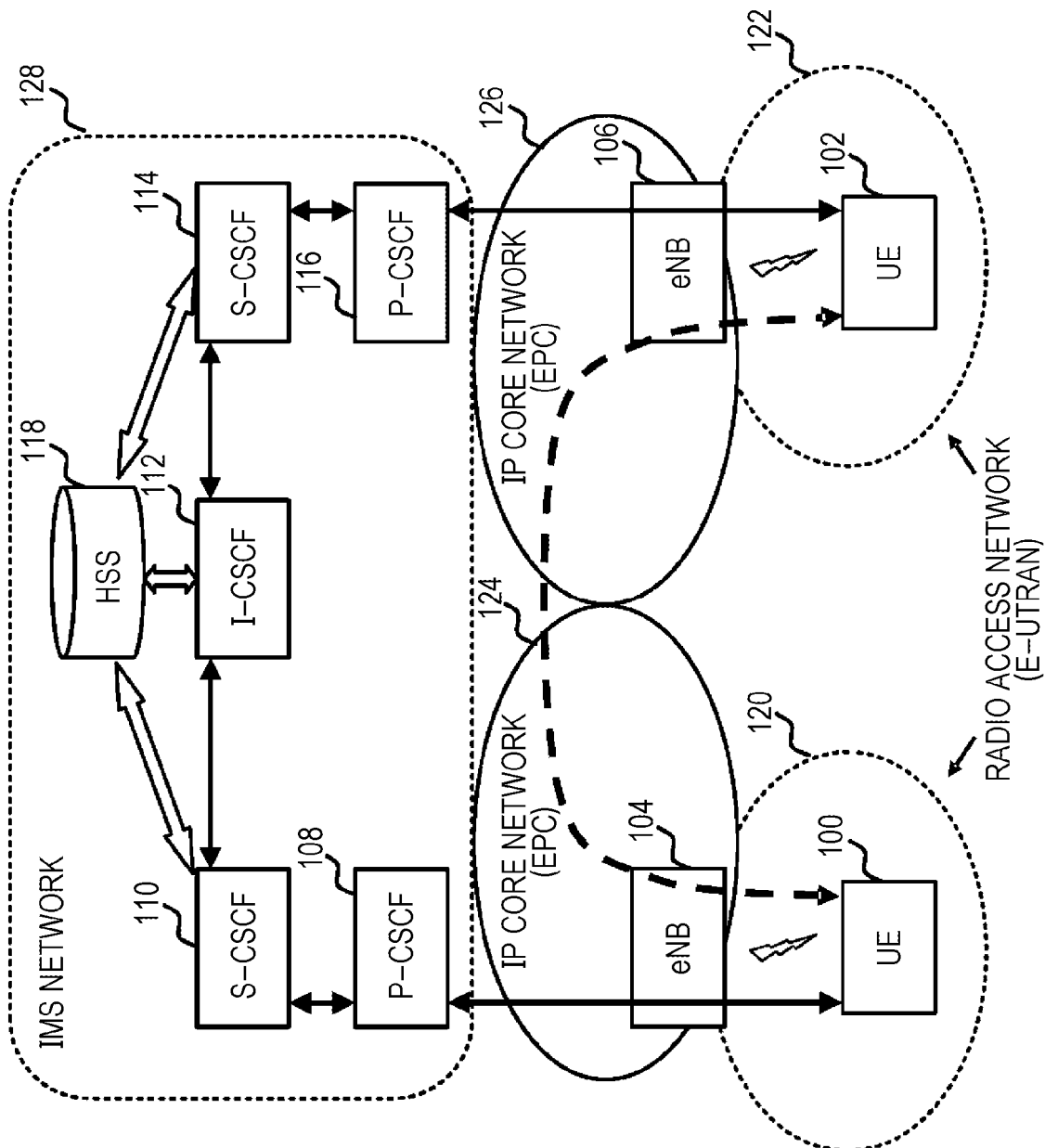
FIG. 1 is a diagram that illustrates an example of configurations of an IMS network, an IP core network, and a radio access network.
Figure 2:
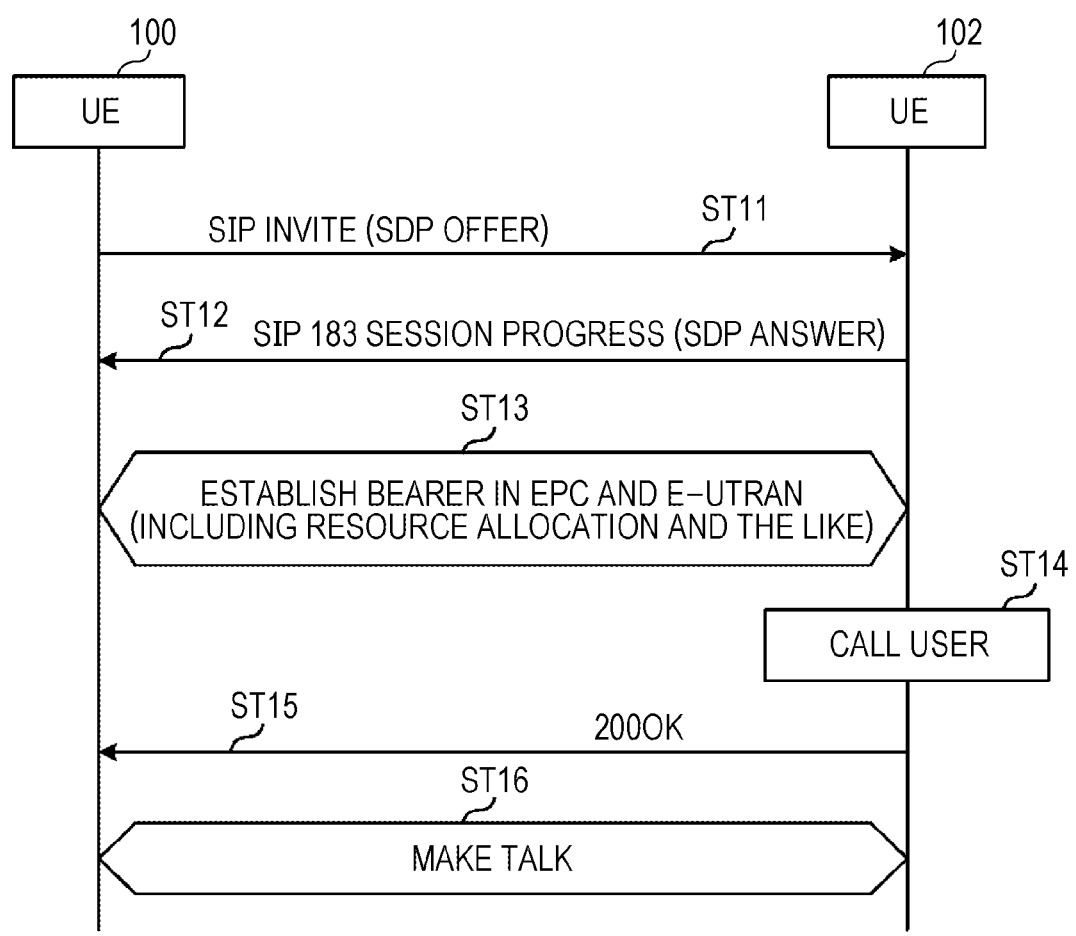
FIG. 2 is a diagram that illustrates an example of basic operations of call session establishment.
Figure 4:
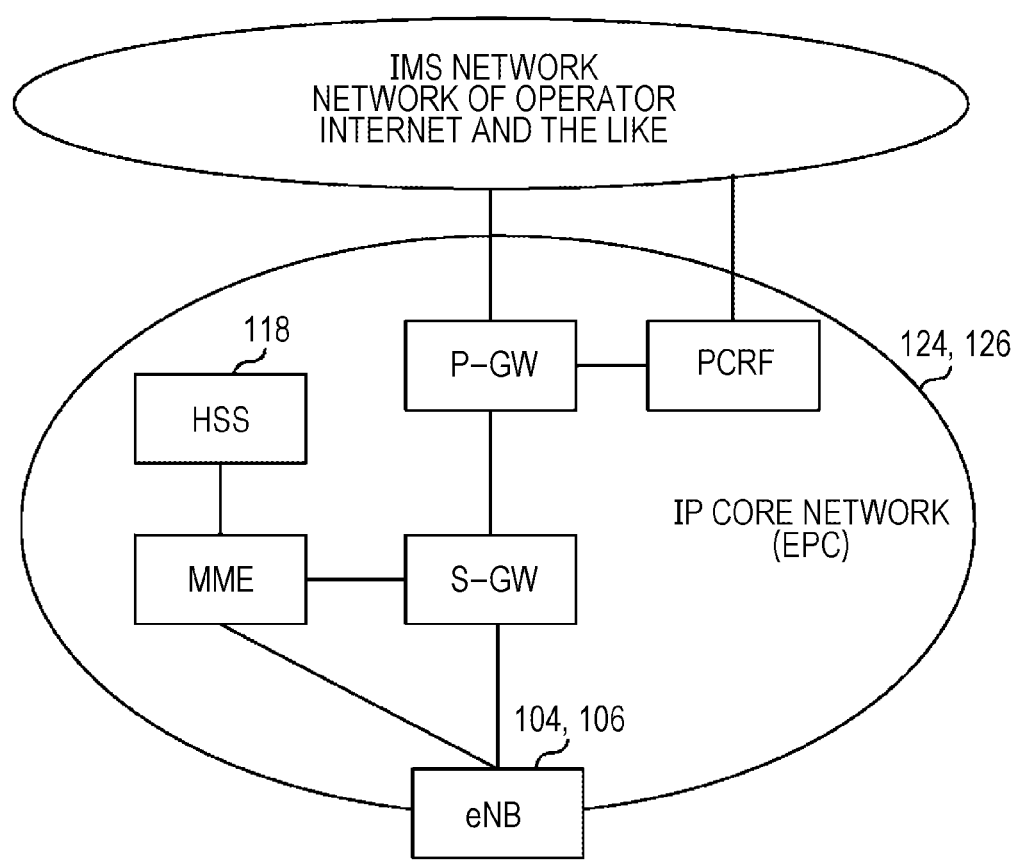
FIG. 4 is a diagram that illustrates an example of a configuration of EPC.
Figure 5:
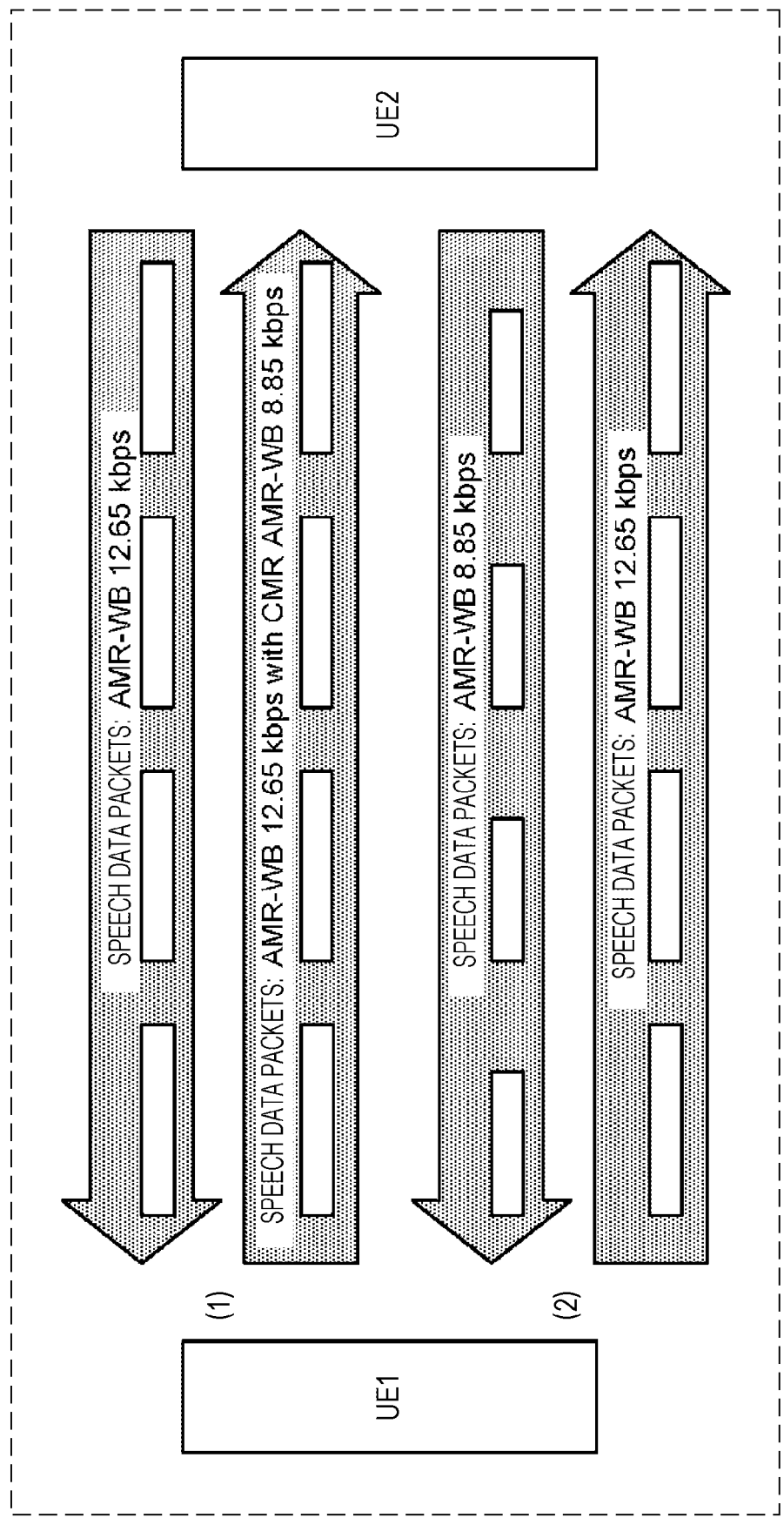
FIG. 5 is a diagram that illustrates an example of bitrate change using a CMR.

SDP offer/answer is created by a UE. Information on a codec or a codec mode supported by a network (E-UTRAN) (policy) is set for each operator. Thus, when the UE roams to another network, a codec or a codec mode supported by the roaming target is likely to be different from the codec or the codec mode supported by the own network. Hence, when the UE roams to the other network, the UE needs to acquire information on the codec or the codec mode supported by the roaming target network (policy of an operator).

Given the circumstances, International Publication No. WO 2012/063417 discloses a method for a UE to acquire a policy of the operator. However, in International Publication No. WO 2012/063417, there is only one policy of an operator, and it is assumed that the policy once acquired by the UE will never change. Thus, International Publication No. WO 2012/063417 is not responsive to change of the policy of an operator when the UE roams or when a radio condition of the UE varies.

A request to change a bitrate while talking to a party UE (or MGW) can be transmitted from only a UE (or MGW), and no other networks get involved with determination and change of the bitrate used for a call. That is, an eNB can know the radio environment of each UE but cannot get involved with the bitrate determination and change during a call between UEs.

Given the circumstances, U.S. Patent Application Publication No. 2010/0284278 discloses a method for instructing a UE to lower a bitrate to a designated value when an eNB detects congestion of a radio access network. However, in U.S. Patent Application Publication No. 2010/0284278, a radio environment of each UE is not taken into consideration for the bitrate change.

U.S. Patent Application Publication No. 2011/0075563 and IETF RFC 3168, "The Addition of Explicit Congestion Notification (ECN) to IP" and 3GPP TS 36.300 v13.2.0, "Evolved Universal Terrestrial Radio Access (E-UTRA) and Evolved Universal Terrestrial Radio Access Network (E-UTRAN); Overall description; Stage 2" disclose a method in which, when an eNB detects congestion or quality loss of a radio access network using Explicit Congestion Notification (ECN), a UE is notified of the congestion or quality loss of the radio access network using low two bits of a field used for QoS management and the like of an IP header, and then the UE receiving the notification lowers a transmission bitrate or transmits a CMR to a party UE to lower the bitrate.

However, when using the ECN, the eNB can notify of merely the congestion or quality loss of the radio access network but cannot notify of alleviation of the congestion or quality improvement of the radio access network. In addition, when using the ECN, the eNB can notify of a condition of the radio access network (congestion or quality loss) but cannot designate an actual bitrate like the CMR. Also, since the ECN uses an IP header field, a compression rate of Robust Header Compression (ROHC) used for header compression in a radio zone in VoLTE is affected.

Therefore, an object of an aspect of the present disclosure is to improve efficiency of radio resource usage while reducing deterioration of a speech quality of UEs by allowing an eNB to instruct a UE to change a bitrate in accordance with a radio condition of each UE or by allowing a UE to appropriately use a policy of an operator in accordance with change of a radio environment of the UE (at roaming or radio condition variation).

(Embodiment 1)

Hereinafter, Embodiment 1 of the present disclosure is described in detail with reference to FIGS. 6 to 14.

[Configuration of Terminal]

Figure 6:
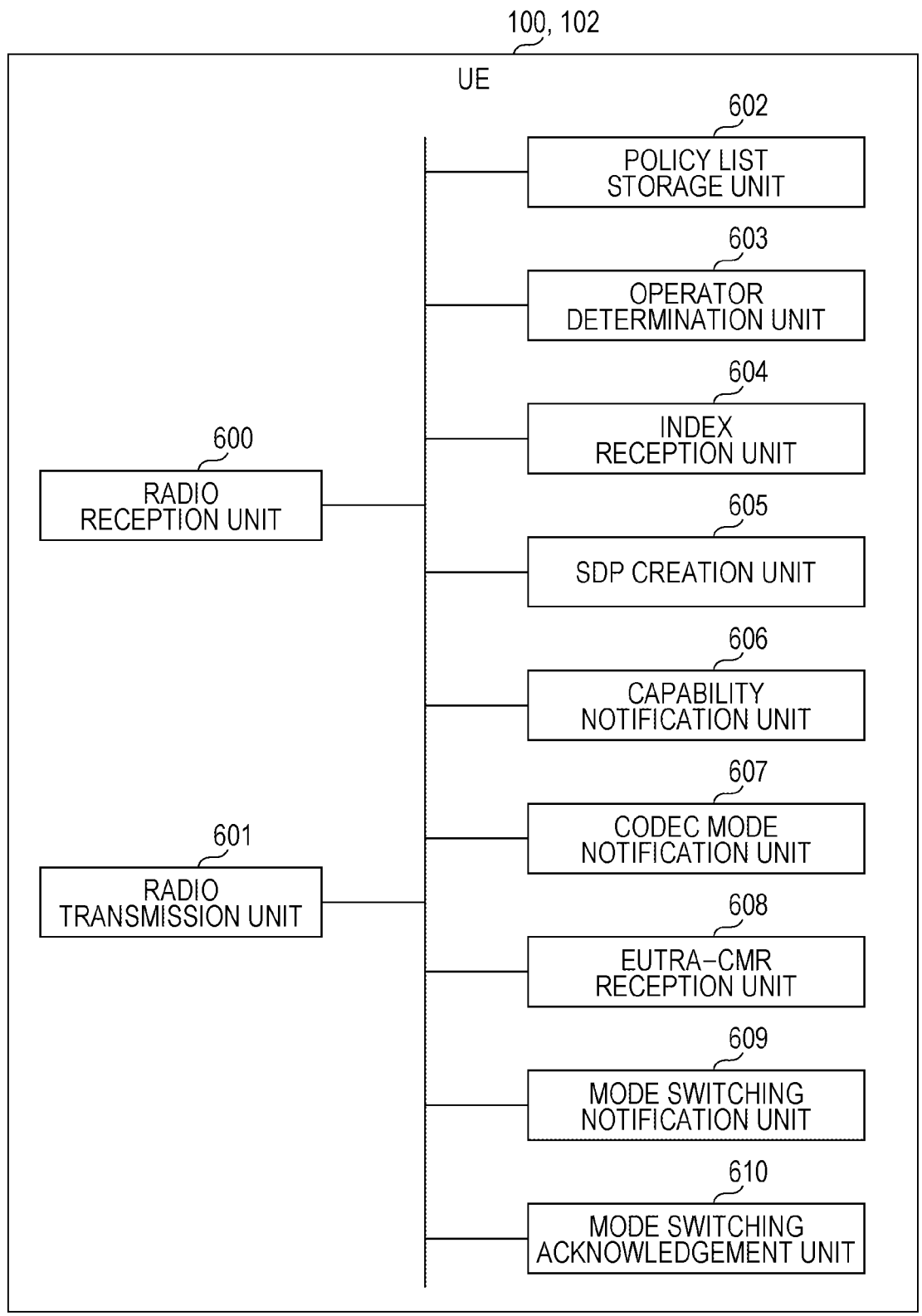
FIG. 6 is a block diagram that illustrates an example of a configuration of a terminal (UE) according to Embodiment 1 of the present disclosure.

FIG. 6 is a block diagram that illustrates a configuration of a terminal (UEs 100, 102) according to this embodiment. Note that FIG. 6 illustrates only a constituent closely related to the present disclosure and a known function of the UE is omitted.

In the UEs 100, 102 illustrated in FIG. 6, a radio reception unit 600 receives signaling or data transmitted from base stations (eNBs 104, 106) or an MME and outputs the received signaling or data to a corresponding constituent of the UEs 100, 102. A radio transmission unit 601 transmits signaling or data inputted from each constituent to the eNBs 104, 106 or the MME.

Figures 8A, 8B:
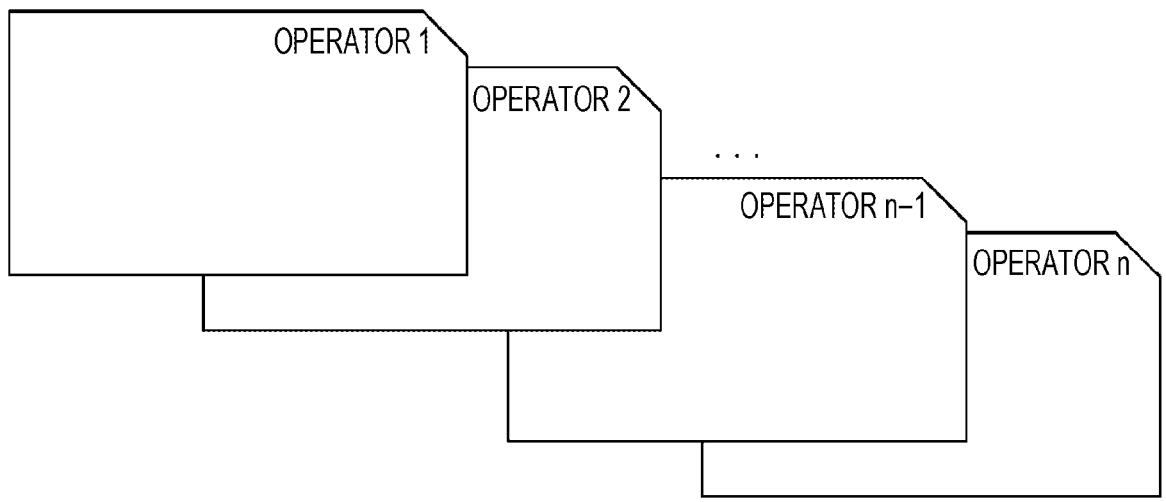
FIG. 8A is a diagram that illustrates policy lists of operators according to Embodiment 1 of the present disclosure.
FIG. 8B is a diagram that illustrates a policy list of an operator k according to Embodiment 1 of the present disclosure.

A policy list storage unit 602 stores at least one policy of each of multiple operators, the policy including a codec mode supported by each operator. For example, the policy list storage unit 602 stores lists of policies of the operators (policy list). FIGS. 8A and 8B are examples of the policy list of each operator that the policy list storage unit 602 stores. FIG. 8A illustrates an example in which policy lists of operators 1 to n are stored while FIG. 8B illustrates a policy list of one operator (operator k) out of the policy lists illustrated in FIG. 8A. Each policy in the policy lists is associated with an index indicating that policy (policy index).

In FIG. 8B, as a policy of index 1, the operator k sets an EVS codec and parameters of the EVS codec in which a bitrate is between 9.6 kbps and 24.4 kbps, an audio band is SWB only, a payload format is a Header-Full format, and reception of a Channel-aware mode is off, while other parameters are set to default setting values. Also for policies below an index 2, out of the codecs or parameters of the codecs, a parameter different from the default setting value is stored in the policy list storage unit 602.

Note that the parameters and the default setting values of the EVS codec are described in 3GPP TS 26.445 v13.0.0, "Codec for Enhanced Voice Services (EVS); Detailed algorithmic description," and parameters and default setting values of an AMR-WB codec and an AMR codec are described in IETF RFC 4867, "RTP Payload Format and File Storage Format for the Adaptive Multi-Rate (AMR) and Adaptive Multi-Rate Wideband (AMR-WB) Audio Codecs" and 3GPP TS 26.114 v13.2.0, "IP Multimedia Subsystem (IMS); Multimedia Telephony; Media handling and interaction."

An operator determination unit 603 in FIG. 6 determines an operator to which the UEs 100, 102 are to connect (hereinafter referred to as a connection target operator). For example, the operator determination unit 603 uses a Public Land Mobile Network (PLMN) ID described in "Evolved Universal Terrestrial Radio Access (E-UTRA) and Evolved Universal Terrestrial Radio Access Network (E-UTRAN); Overall description; Stage 2" to determine a connection target operator for the UEs 100, 102.

Note that, when the eNBs 104, 106 are connected to MMEs of multiple operators, the operator determination unit 603 determines which MMEs of the operators are connected to the eNBs 104, 106 in, for example, an Attach Procedure described in 3GPP TS 23.401 v13.5.0, "General Packet Radio Service (GPRS) enhancements for Evolved Universal Terrestrial Radio Access Network (E-UTRAN) access." When there are multiple candidates for the connection target operator the operator determination unit 603 may select a preferable connection target operator.

From the eNBs or the MME, an index reception unit 604 receives one or more policy indexes indicating the policy to be used in the connection target operator for the UEs 100, 102. Note that, every time the policy to be used in the connection target operator for the UEs 100, 102 is changed in the eNBs 104, 106, the index reception unit 604 receives the policy index indicating the changed policy.

An SDP creation unit 605 uses the information acquired from the policy list storage unit 602, the operator determination unit 603, and the index reception unit 604 to create the SDP offer or the SDP answer and negotiates a mechanism to be used in a call. That is, the SDP creation unit 605 creates the SDP offer or the SDP answer by selectively using one of the policies stored in the policy list storage unit 602 according to the policy index received by the index reception unit 604, the used policy being the policy used in the operator which the operator determination unit 603 determines as a connection target operator for the UEs 100, 102, and negotiates the call between the host terminal and the terminal that is to communicate with the host terminal.

In addition, the SDP creation unit 605 may apply a parameter indicating that the UEs 100, 102 support the function disclosed in this embodiment (later-described codec mode switching using an EUTRA-CMR) to the SDP offer or the SDP answer to negotiate the use of the EUTRA-CMR.

A capability notification unit 606 notifies the eNBs or the MME of information indicating that the UEs 100, 102 support the codec mode switching using the EUTRA-CMR (capability information).

Out of the mechanisms negotiated by the SDP creation unit 605, a codec mode notification unit 607 notifies the eNBs of information on the codec mode (bitrate, audio band, and the like). With this information, at this point, the codec mode notification unit 607 may notify the eNBs of information on the negotiated codec. In addition, when the codec mode switching using the EUTRA-CMR is selected in the negotiation of a call, the codec mode notification unit 607 notifies the eNBs 104, 106 of a range of the negotiated bitrate.

An EUTRA-CMR reception unit 608 receives the EUTRA-CMR from the eNBs 104, 106. The EUTRA-CMR includes a codec mode that is determined by the eNBs 104, 106 in accordance with a radio condition of the UEs 100, 102 (switching codec mode; e.g., bitrate). The EUTRA- CMR is a CMR using Layer2 or Layer3 of E-UTRANs 120, 122 (described in "Evolved Universal Terrestrial Radio Access (E-UTRA) and Evolved Universal Terrestrial Radio Access Network (E-UTRAN); Overall description; Stage 2").

For example, the EUTRA-CMR may use a MAC Control Element (CE) (Layer2) described in 3GPP TS 36.321 v13.0.0, "Evolved Universal Terrestrial Radio Access (E-UTRA); Medium Access Control (MAC) protocol specification" and may use a MAC header, an RLC header, a PDCP header (Layer2), and the like described in 3GPP TS 36.321 v13.0.0, "Evolved Universal Terrestrial Radio Access (E-UTRA); Medium Access Control (MAC) protocol specification" or "Evolved Universal Terrestrial Radio Access (E-UTRA) and Evolved Universal Terrestrial Radio Access Network (E-UTRAN); Overall description; Stage 2." Otherwise the EUTRA-CMR may use RRC signaling (Layer3) described in 3GPP TS 36.331 v13.0.0, "Evolved Universal Terrestrial Radio Access (E-UTRA); Radio Resource Control (RRC); Protocol specification." Thus, when transmitting the EUTRA-CMR, it is possible to avoid an effect on a compression rate of the ROHC due to the use of the IP header field like the ECN.

A mode switching notification unit 609 notifies an encoder (not illustrated) of switching to a switching target codec mode included in the EUTRA-CMR received by the EUTRA-CMR reception unit 608 to instruct the encoder to switch the codec mode.

A mode switching acknowledgement unit 610 transmits a response message (acknowledgement) to the eNBs 104, 106 when acknowledging that the encoder switches the codec mode according to the EUTRA-CMR. A Buffer Status Report (BSR) described in 3GPP TS 36.321 v13.0.0, "Evolved Universal Terrestrial Radio Access (E-UTRA); Medium Access Control (MAC) protocol specification" or another MAC CE may be used for transmitting the response message. Otherwise, the RRC signaling described in 3GPP TS 36.331 v13.0.0, "Evolved Universal Terrestrial Radio Access (E-UTRA); Radio Resource Control (RRC); Protocol specification" may be used for transmitting the response message.

[Configuration of Base Station]

Figure 7:
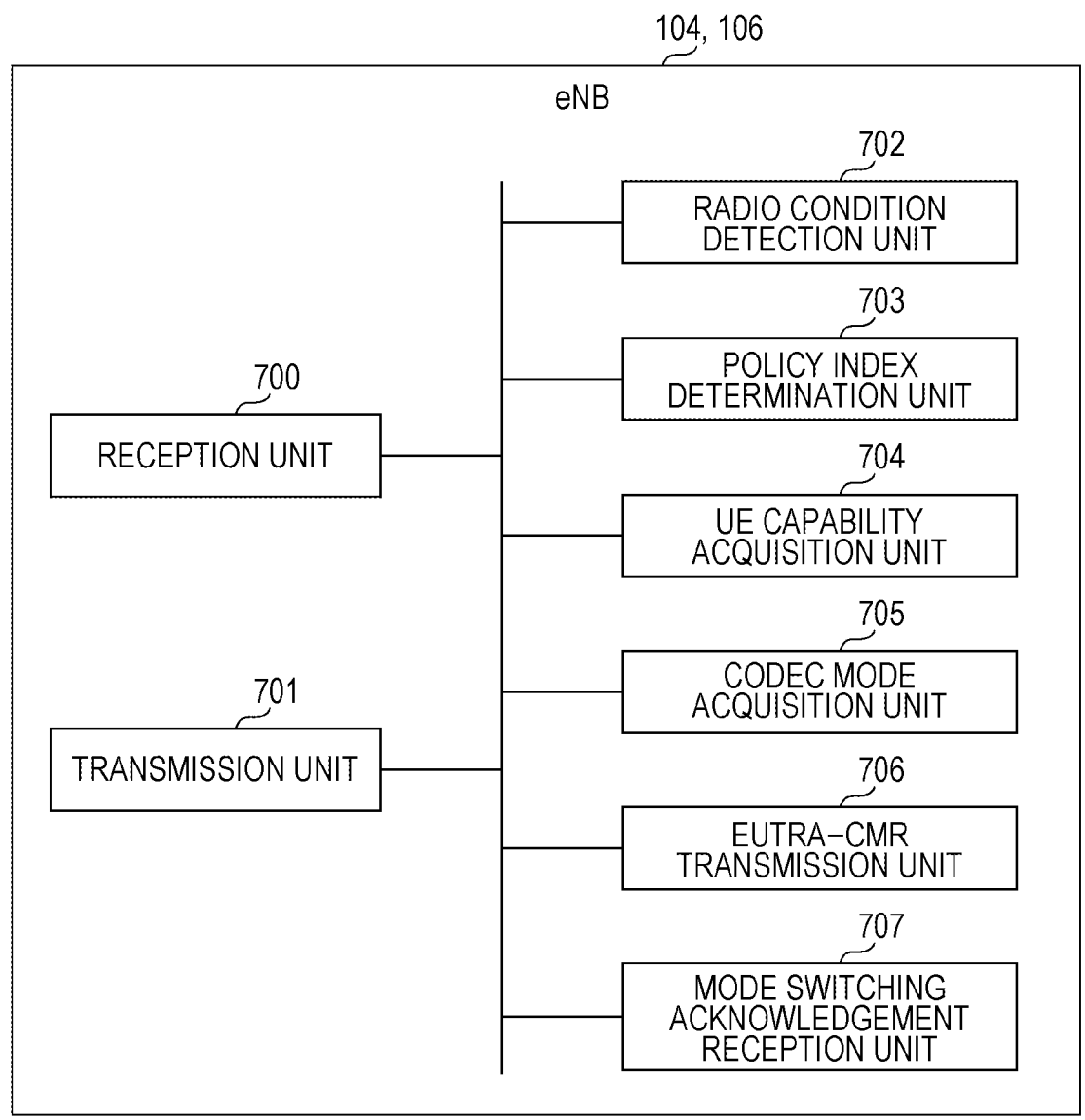
FIG. 7 is a block diagram that illustrates an example of a configuration of a base station (eNB) according to Embodiment 1 of the present disclosure.

FIG. 7 is a block diagram that illustrates a configuration of a base station (eNBs 104, 106) according to this embodiment. Note that FIG. 7 illustrates only a constituent closely related to the present disclosure and a known function of the eNB is omitted.

In the eNBs 104, 106 illustrated in FIG. 7, a reception unit 700 receives signaling or data transmitted from the UEs 100, 102, the MME, or the S-GW, and outputs the received signaling or data to a corresponding constituent of the eNBs 104, 106. A transmission unit 701 transmits the signaling or the data inputted from each constituent to the UEs 100, 102, the MME, or the S-GW.

A radio condition detection unit 702 detects congestion of the radio access network, a state of congestion alleviation, or a state of the radio environment of each UE. For example, the radio condition detection unit 702 may detect a state of the radio environment of each UE from a Power Headroom Report (PHR) described in 3GPP TS 36.321 v13.0.0, "Evolved Universal Terrestrial Radio Access (E-UTRA); Medium Access Control (MAC) protocol specification" or from a measurement report described in 3GPP TS 36.331 v13.0.0, "Evolved Universal Terrestrial Radio Access (E-UTRA); Radio Resource Control (RRC); Protocol specification."

Based on a default policy index that each operator has and congestion of the radio access network, a state of congestion alleviation or a state of the radio environment of each UE detected by the radio condition detection unit 702, a policy index determination unit 703 determines a policy index for each of the UEs 100, 102 and notifies the respective UEs 100, 102 of the determined policy index. Every time the policy index for the respective UEs 100, 102 is changed because of the change in the radio condition detected by the radio condition detection unit 702, the policy index determination unit 703 may notify the UEs 100, 102 of the changed policy index.

A UE capability acquisition unit 704 inquires of the UEs 100, 102 whether the UEs 100, 102 support the codec mode switching using the EUTRA-CMR, and acquires capability information indicating that the UEs 100, 102 support the codec mode switching using the EUTRA-CMR from the UEs 100, 102. Instead of inquiring of the UEs 100, 102, the UE capability acquisition unit 704 may acquire the capability information on the UEs 100, 102 from the MME.

A codec mode acquisition unit 705 acquires information on the codec mode negotiated by the UEs 100, 102 starting to talk (e.g., negotiated bitrate range) from the UEs 100, 102. The codec mode acquisition unit 705 may acquire the negotiated codec mode information from the UEs 100, 102 supporting the EUTRA-CMR or may acquire it from a node on the EPC side.

An EUTRA-CMR transmission unit 706 determines the codec mode to be used by the UEs 100, 102 in accordance with congestion of the radio access network or a radio condition of the UEs 100, 102 supporting the EUTRA-CMR, which is detected by the radio condition detection unit 702, and transmits EUTRA-CMR including the determined codec mode to the UEs 100, 102 supporting the EUTRA-CMR. Note that the EUTRA-CMR transmission unit 706 determines the codec mode to be included in the EUTRA-CMR based on the codec mode information acquired by the codec mode acquisition unit 705 (negotiated bitrate range and the like).

From the UEs 100, 102 as the transmission destination of the EUTRA-CMR, a mode switching acknowledgement reception unit 707 receives the response message (acknowledgement) indicating completion of switching to the codec mode included in the EUTRA-CMR.

Note that, hereinafter, the UEs 100, 102 that support the codec mode switching using the EUTRA-CMR may be mentioned merely as "UE" in some cases. Also, hereinafter, the eNBs 104, 106 illustrated in FIG. 7 may be mentioned merely as "eNB" in some cases.

[Policy Index Notification Method]

Next, an example of a policy index notification method of the operator is described in detail with reference to FIGS. 9A to 9C.

Figure 9A:
FIG. 9A is a diagram that illustrates an example of a policy index notification method according to Embodiment 1 of the present disclosure.

In FIG. 9A, the policy index determination unit 703 of the eNB stores the determined policy index into RRC signaling (RRC dedicated signaling) (described in 3GPP TS 36.331 v13.0.0, "Evolved Universal Terrestrial Radio Access (E-UTRA); Radio Resource Control (RRC); Protocol specification"), which is individually transmitted to a corresponding UE, and notifies the UE of the determined policy index. FIG. 9A illustrates RRCConnectionSetup as an example of the RRC dedicated signaling; however, other RRC dedicated signaling (e.g., RRCConnectionRecnfiguration) may be used.

Figure 9B:
FIG. 9B is a diagram that illustrates an example of the policy index notification method according to Embodiment 1 of the present disclosure.

In FIG. 9B, the policy index determination unit 703 of the eNB stores the determined policy index into RRC signaling (broadcast signaling) (described in 3GPP TS 36.331 v13.0.0, "Evolved Universal Terrestrial Radio Access (E-UTRA); Radio Resource Control (RRC); Protocol specification"), which is for broadcasting to all the UEs in the radio access network, and notifies the UE of the determined policy index. FIG. 9B illustrates a System Information Block (SIB) as an example of the broadcast signaling; however, other broadcast signaling may be used.

Figure 9C:
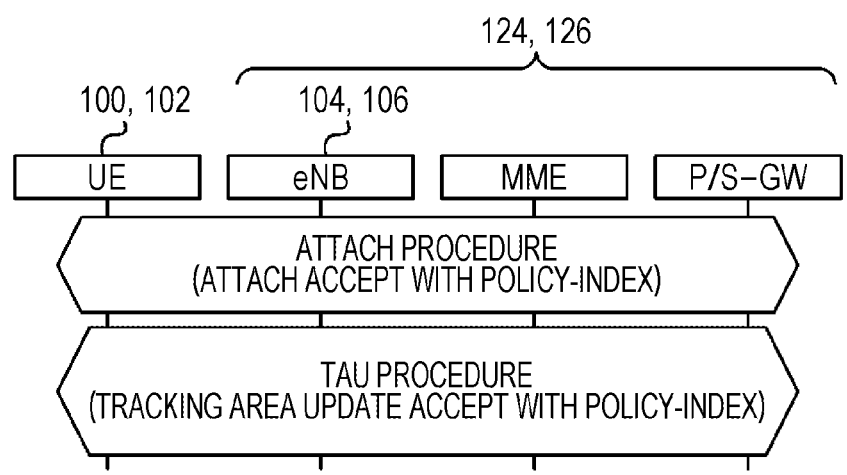
FIG. 9C is a diagram that illustrates an example of the policy index notification method according to Embodiment 1 of the present disclosure.

In FIG. 9C, the policy index is transmitted from EPCs 124, 126 to the UE. In FIG. 9C, in the Attach Procedure described in 3GPP TS 23.401 v13.5.0, "General Packet Radio Service (GPRS) enhancements for Evolved Universal Terrestrial Radio Access Network (E-UTRAN) access" or a Tracking Area Update Procedure (TAU), the policy index is transmitted from the EPCs 124, 126 to the UE with parameters of the signaling (Attach accept or Tracking Area Update accept). The method illustrated in FIG. 9C is, for example, used in a case where the operator determines the policy index based on a contract with the corresponding UE. The policy index based on the contract information on the UE is stored in the MME, for example. Note that, as described above, the policy index based on the contract information on the UE may be notified to the eNB from the MME and may be finally determined by the policy index determination unit 703 of the eNB.

In FIGS. 9A to 9C, from the policy list stored in the policy list storage unit 602, the UE specifies a policy to be used by the operator based on the operator determined by the operator determination unit 603 and the policy index received by the index reception unit 604, and describes the SDP offer and answer for starting to talk based on the specified policy.

In this way, since the UE stores the policy of multiple operators in advance, and the policy index is notified from the eNB to the UE, the UE can use the policy of the operator in accordance with the radio environment (congestion, radio quality, or radio condition of UE) of the E-UTRANs 120, 122. For example, even when the UE roams to a network with a different codec mode, the UE still can use a policy used in that roaming target network. In addition, even when the radio environment of the network in which the UE exists, the UE still can use an appropriate policy in accordance with variation of the radio environment of the network. The UE also can use an appropriate policy in accordance with whether the UE is linked with a macrocell or femtocell.

[Capability Information Notification Method]

Next, an example of a capability information notification method indicating that the UE supports the codec mode switching using the EUTRA-CMR is described in detail with reference to FIGS. 10A and 10B.

Figure 10A:
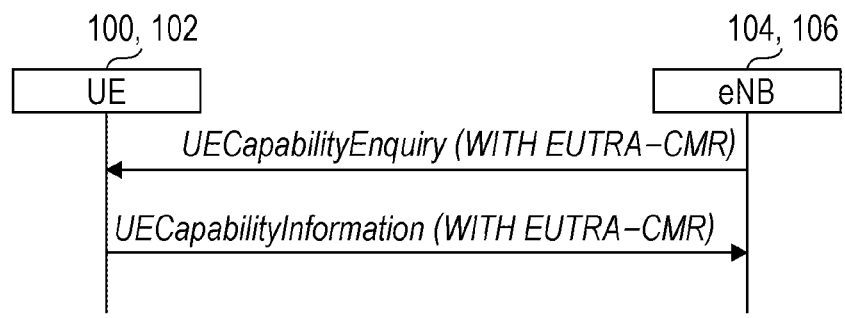
FIG. 10A is a diagram that illustrates an example of a capability information notification method according to Embodiment 1 of the present disclosure.

In FIG. 10A, the UE capability acquisition unit 704 of the eNB uses RRC dedicated signaling (e.g., UECapabilityEnquiry) to inquire the capability of the UE (whether the UE supports the EUTRA-CMR). The capability notification unit 606 of the UE then uses RRC dedicated signaling (e.g., UECapabilityInformation) to transmit to the eNB the capability information indicating that the UE supports the EUTRA-CMR. FIG. 10A illustrates a method using UECapabilityEnquiry and UECapabilityInformation described in 3GPP TS 36.331 v13.0.0, "Evolved Universal Terrestrial Radio Access (E-UTRA); Radio Resource Control (RRC); Protocol specification" as an example of the RRC dedicated signaling; however, other RRC dedicated signaling may be used.

Figure 10B:
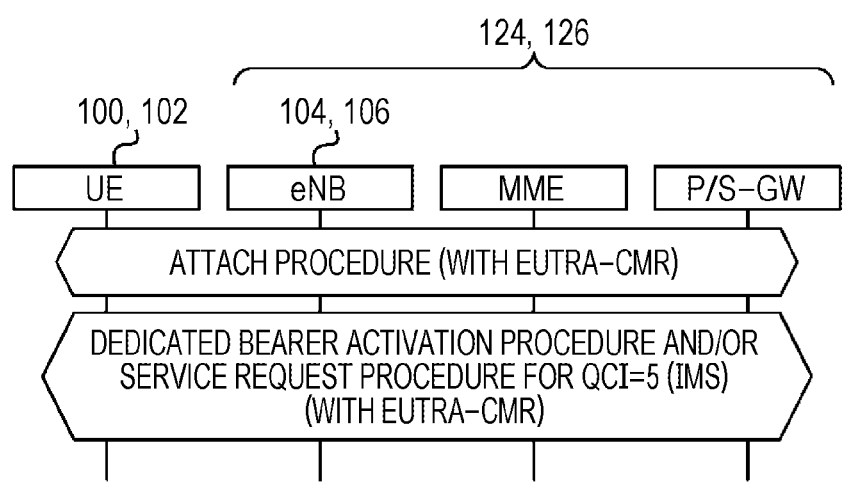
FIG. 10B is a diagram that illustrates an example of the capability information notification method according to Embodiment 1 of the present disclosure.

In FIG. 10B, the UE notifies the eNB of the capability information on the UE by way of the EPCs 124, 126. First, in the above-described Attach Procedure, the capability notification unit 606 of the UE adds to signaling the capability information indicating that the UE supports the EUTRA-CMR as a parameter and transmits the signaling to the MME. At this point, the MME may acquire the capability information on the UE from an HSS 118 instead of the UE. Thereafter, for example, when a bearer for IMS signaling is established (in a dedicated bearer activation procedure and/or service request procedure), the UE capability acquisition unit 704 acquires from the MME the capability information on the UE as the parameter of the signaling.

This allows the eNB to know in advance which one of the UEs in the E-UTRANs 120, 122 covered by itself supports the EUTRA-CMR.

[Negotiated Codec Mode Notification Method]

Next, an example of a notification method of a codec mode negotiated between the UEs starting to talk is described in detail with reference to FIGS. 11A and 11B.

Figure 11A:
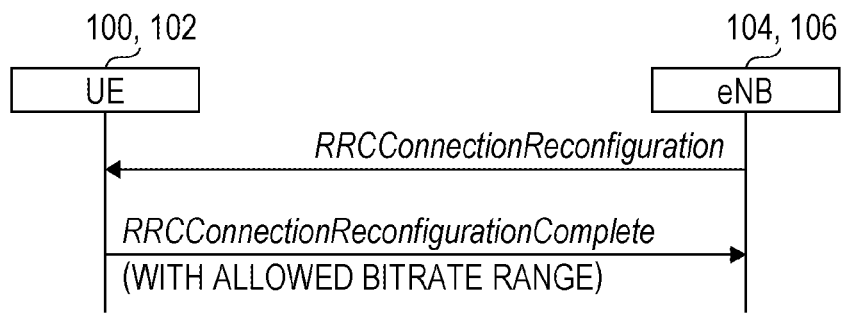
FIG. 11A is a diagram that illustrates an example of a negotiated codec mode notification method according to Embodiment 1 of the present disclosure.

In FIG. 11A, the codec mode notification unit 607 of the UE uses RRC dedicated signaling (e.g., RRCConnectionReconfigurationComplete) to notify the codec mode acquisition unit 705 of the eNB of information indicating the negotiated codec mode (e.g., negotiated bitrate range). In FIG. 11A, a method using RRCConnectionReconfigurationComplete corresponding to the RRC dedicated signaling described in 3GPP TS 36.331 v13.0.0, "Evolved Universal Terrestrial Radio Access (E-UTRA); Radio Resource Control (RRC); Protocol specification" is indicated as an example of the RRC dedicated signaling; however, other RRC dedicated signaling may be used.

When the SDP creation unit 605 of the UE adds the parameter indicating that the UE supports the EUTRA-CMR to the SDP offer or the SDP answer for negotiation and then this negotiation is failed, the codec mode notification unit 607 may not notify the eNB of the codec mode but notify the eNB of the fail of negotiation.

Figure 11B:
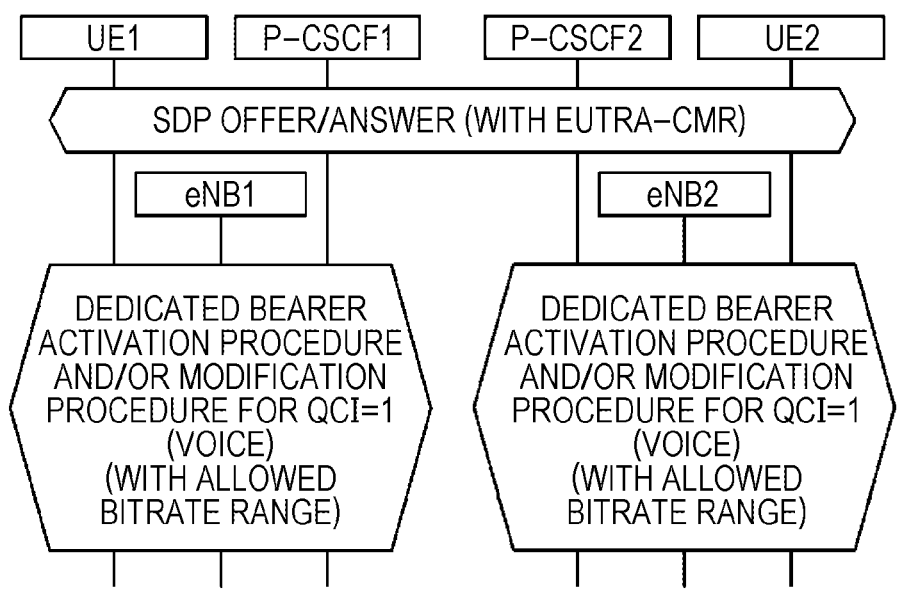
FIG. 11B is a diagram that illustrates an example of the negotiated codec mode notification method according to Embodiment 1 of the present disclosure.

In FIG. 11B, the IMS network 128 and the EPCs 124, 126 sides notify the codec mode acquisition unit 705 of the eNB of the codec mode.

In specific, P-CSCFs 1, 2, which are nodes for relaying the SDP offer and answer of the UEs 1, 2 starting to talk, check the negotiated codec mode. At this point, the P-CSCFs 1, 2 may check an SDP parameter (eutra-cmr) indicating that the UE supports the codec mode switching using the EUTRA-CMR to determine whether the codec mode switching using the EUTRA-CMR is negotiated.

The P-CSCFs 1, 2 notify the PCRF of the EPCs 124, 126 of the negotiated codec mode (e.g., negotiated bitrate range), the PCRF then transmits the acquired codec mode to the P-GW, and the P-GW includes the codec mode as a parameter in the signaling for establishing a bearer for call. The codec mode acquisition unit 705 of the eNB receives this signaling to acquire the negotiated codec mode.

Now, a describing method for notifying the eNB of the codec mode negotiated by the UE is described. As an example, a case where the negotiated codec is the EVS codec, the negotiated bitrate is between 9.6 kbps and 24.4 kbps, the audio band is the SWB, and the Channel Aware mode is not used is described.

For example, a format of the negotiated codec mode may be described as "EVS: br=9.6-24.4; bw=swb; ch-aw-recv=−1" by using a description of a media type parameter described in Annex A.3 of 3GPP TS 26.445 v13.0.0, "Codec for Enhanced Voice Services (EVS); Detailed algorithmic description." The negotiated codec mode may be described as "T=011, D=0011-0110" by being mapped to a code of the CMR described in Annex A.2.2.1.1 of 3GPP TS 26.445 v13.0.0, "Codec for Enhanced Voice Services (EVS); Detailed algorithmic description." These describing methods can make descriptions using the media type parameter and the CMR code (index) described in IETF RFC 4867, "RTP Payload Format and File Storage Format for the Adaptive Multi-Rate (AMR) and Adaptive Multi-Rate Wideband (AMR-WB) Audio Codecs" and 3GPP TS 26.114 v13.2.0, "IP Multimedia Subsystem (IMS); Multimedia Telephony; Media handling and interaction" even when the negotiated codec is the AMR or the AMR-WB. When a describing method designated by the operator is indicated in the policy list of the operator retained by the UE, the codec mode may be described according to that describing method.

In this way, since the UE notifies the eNB of the negotiated codec mode, the eNB can specify in advance the range of the codec mode (bitrate) designated by using the EUTRA-CMR.

Before performing the codec mode switching using the EUTRA-CMR, the UE negotiates use of the codec mode switching using the EUTRA-CMR with the called party, and when both the UEs reach an agreement, the UE notifies the eNB of the negotiated codec mode. The eNB thus can use the bitrate negotiated between the talking UEs to make an instruction to switch the codec mode using the EUTRA-CMR.

[Codec Mode Switching Method Using EUTRA-CMR]

Next, an example of the method of switching the codec mode (bitrate) using the EUTRA-CMR by the eNB is described in detail with reference to FIGS. 12A to 14.

For example, it is assumed that there are conditions for the negotiated codec and codec mode, that is, the EVS, the bitrate is between 9.6 kbps and 24.4 kbps, the audio band is the SWB, and the Channel Aware mode is not used.

FIGS. 12A, 12B, 12C, 13A, 13B, and 13C illustrate an example of the MAC CE when the MAC CE described in 3GPP TS 36.321 v13.0.0, "Evolved Universal Terrestrial Radio Access (E-UTRA); Medium Access Control (MAC) protocol specification" is used for the EUTRA-CMR.

Figures 12A, 12B, 12C:
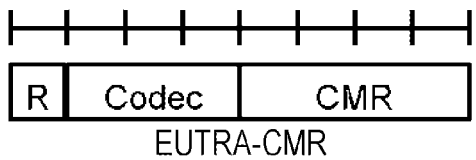
FIG. 12A is a diagram that illustrates an example of an LCID value when a MAC CE is used for an EUTRA-CMR according to Embodiment 1 of the present disclosure.
FIG. 12B is a diagram that illustrates an example of a configuration of the MAC CE when the MAC CE is used for the EUTRA-CMR according to Embodiment 1 of the present disclosure.
FIG. 12C is a diagram that illustrates an example of correspondence between a codec or a codec mode and a value of a Codec field when the MAC CE is used for the EUTRA-CMR according to Embodiment 1 of the present disclosure.

FIGS. 12A to 12C illustrate an example of a case where one of reserved values (Reserved) of Logical Channel Identifier (LCID) of 3GPP TS 36.321 v13.0.0, "Evolved Universal Terrestrial Radio Access (E-UTRA); Medium Access Control (MAC) protocol specification" is defined as the EUTRA-CMR. In FIG. 12A, an LCID value (Index) ="11001" is allocated as the EUTRA-CMR, as an example. FIG. 12B illustrates an example of a configuration of the MAC CE of the EUTRA-CMR. An R bit indicates that it is reserved. A Codec field having three bits is filled with a value indicating which codec or codec mode is of the CMR. FIG. 12C indicates an example of correspondence between the codec or codec mode and the value (Index) of the Codec field. A CMR field having four bits in FIG. 12B is filled with a value (Index) of the requested codec mode (bitrate and the like). The value of the CMR field is, for example, based on a value of the CMR of IETF RFC 4867, "RTP Payload Format and File Storage Format for the Adaptive Multi-Rate (AMR) and Adaptive Multi-Rate Wideband (AMR-WB) Audio Codecs" for the case of the AMR or the AMR-WB while it is based on a value of a D field in a CMR byte of 3GPP TS 26.445 v13.0.0, "Codec for Enhanced Voice Services (EVS); Detailed algorithmic description" for the case of the EVS.

Regarding the EVS codecs in FIG. 12C, EVS AMR-WB IO is an AMR-WB compatible mode. EVS-NB, EVS-WB, EVS-SWB, and EVS-FB are an EVS primary mode narrowband, an EVS primary mode wideband, an EVS primary mode super wideband, and an EVS primary mode fullband, respectively. EVS-CA-WB and EVS-CA-SWB are a Channel Aware mode of the EVS primary mode wideband and a Channel Aware mode of the EVS primary mode super wideband, respectively.

Figures 13A, 13B, 13C:
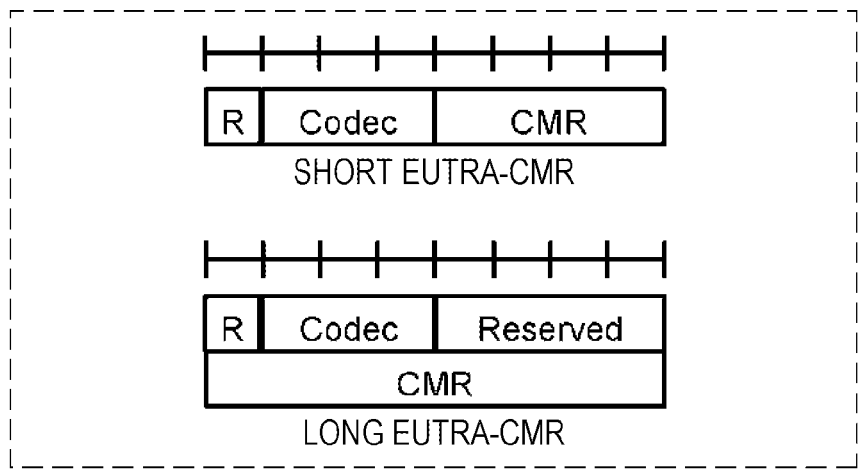
FIG. 13A is a diagram that illustrates an example of the LCID value when the MAC CE is used for the EUTRA-CMR according to Embodiment 1 of the present disclosure.
FIG. 13B is a diagram that illustrates an example of a configuration of the MAC CE when the MAC CE is used for the EUTRA-CMR according to Embodiment 1 of the present disclosure.
FIG. 13C is a diagram that illustrates an example of correspondence between the codec and a value of the Codec field (Index) when the MAC CE is used for the EUTRA-CMR according to Embodiment 1 of the present disclosure.

FIGS. 13A to 13C indicate an example of a case where two of the reserved values (Reserved) of the Logical Channel Identifier (LCID) of 3GPP TS 36.321 v13.0.0, "Evolved Universal Terrestrial Radio Access (E-UTRA); Medium Access Control (MAC) protocol specification" are defined as the EUTRA-CMR. In FIG. 13A, an LCID value (Index) ="11000" is allocated as a Short EUTRA-CMR while the LCID value (Index)="11001" is allocated as a Long EUTRA-CMR, as an example. FIG. 13B illustrates an example of configurations of each MAC CE of the Short EUTRA-CMR and the Long EUTRA-CMR. The R bit indicates that it is reserved. The Codec field having three bits is filled with a value indicating which codec is of the CMR. FIG. 13C indicates an example of correspondence between the codec and the value (Index) of the Codec field. In FIG. 13B, the CMR field has four bits in the case of the Short EUTRA-CMR and has eight bits in the case of the Long EUTRA-CMR, and the CMR field is filled with a value (Index) of the requested codec mode (bitrate and the like). The value of the CMR field is, for example, based on a value of the CMR of IETF RFC 4867, "RTP Payload Format and File Storage Format for the Adaptive Multi-Rate (AMR) and Adaptive Multi-Rate Wideband (AMR-WB) Audio Codecs" using the Short EUTRA-CMR for the case of the AMR or the AMR-WB while it is based on a value of the CMR byte of 3GPP TS 26.445 v13.0.0, "Codec for Enhanced Voice Services (EVS); Detailed algorithmic description" using the Long EUTRA-CMR for the case of the EVS.

Note that the R bit may be used as a bit representing the EUTRA-CMR in a downlink direction that is described later.

Figure 14:
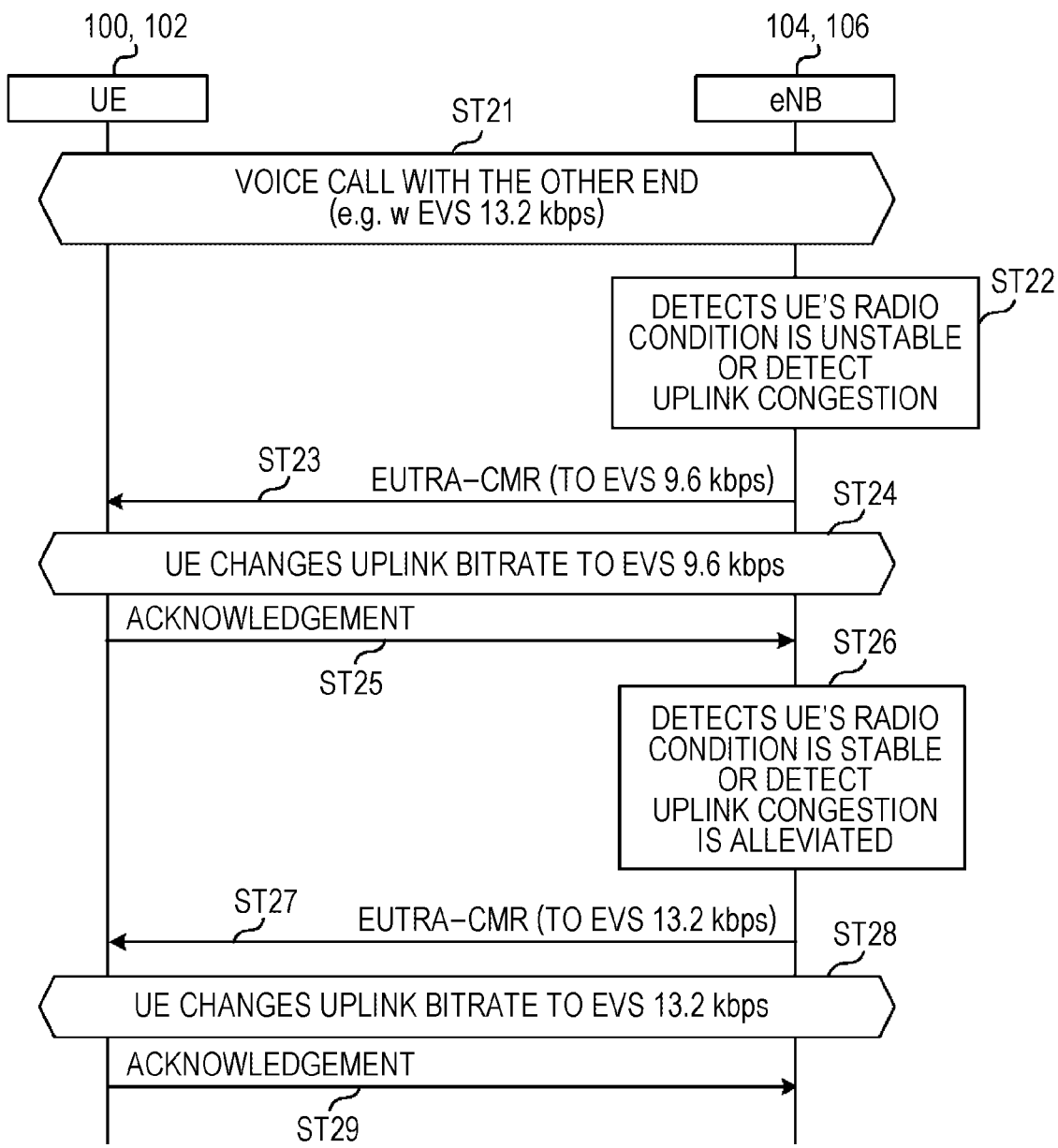
FIG. 14 is a diagram that illustrates an example of bitrate change using the EUTRA-CMR according to Embodiment 1 of the present disclosure.

In FIG. 14, first, the UE performs encoding with the SWB of the EVS codec (hereinafter called as EVS-SWB) at 13.2 kbps and transmits voice data (ST21).

Next, the radio condition detection unit 702 of the eNB detects that the radio environment of the UE is unstable or that the E-UTRAN (uplink) is congested (ST22). The EUTRA-CMR transmission unit 706 of the eNB determines to make an instruction to lower the bitrate to be used for transmission of the UE to 9.6 kbps, designates EVS-SWB 9.6 kbps as the EUTRA-CMR, and transmits it to the UE (ST23).

The EUTRA-CMR reception unit 608 of the UE receives the EUTRA-CMR and outputs to the mode switching notification unit 609 that EVS-SWB 9.6 kbps is designated. The mode switching notification unit 609 instructs an EVS encoder (not illustrated) of the UE to encode at EVS-SWB 9.6 kbps. The EVS encoder of the UE receives the instruction on EVS-SWB 9.6 kbps and then changes the bitrate to EVS-SWB 9.6 kbps to start encoding (ST24). Once acknowledging that the EVS encoder switches the bitrate to EVS-SWB 9.6 kbps, the mode switching acknowledgement unit 610 of the UE transmits Acknowledgement to the eNB (ST25).

By receiving Acknowledgement, the mode switching acknowledgement reception unit 707 of the eNB detects that the codec mode of the voice data transmitted from the UE is switched as instructed.

Next, the radio condition detection unit 702 of the eNB detects that the radio environment of the UE is improved or the congestion of the E-UTRAN (uplink) is alleviated (ST26). The EUTRA-CMR transmission unit 706 of the eNB determines to make an instruction to raise the bitrate to be used for transmission of the UE to 13.2 kbps again, designates EVS-SWB 13.2 kbps as the EUTRA-CMR, and transmits it to the UE (ST27).

The EUTRA-CMR reception unit 608 of the UE receives the EUTRA-CMR and outputs to the mode switching notification unit 609 that EVS-SWB 13.2 kbps is designated. The mode switching notification unit 609 instructs the EVS encoder (not illustrated) of the UE to encode at EVS-SWB 13.2 kbps. The EVS encoder of the UE receives the instruction on EVS-SWB 13.2 kbps and then changes the bitrate to EVS-SWB 13.2 kbps to start encoding (ST28). Once acknowledging that the EVS encoder switches the bitrate to EVS-SWB 13.2 kbps, the mode switching acknowledgement unit 610 of the UE transmits Acknowledgement to the eNB (ST29).

By receiving Acknowledgement, the mode switching acknowledgement reception unit 707 of the eNB detects that the codec mode of the voice data transmitted from the UE is switched as instructed.

Note that, when Semi-Persistent Scheduling (SPS) described in 3GPP TS 36.213 v13.0.0, "Evolved Universal Terrestrial Radio Access (E-UTRA); Physical layer procedures" and the like is used for the uplink scheduling of the E-UTRAN, the eNB may change the settings of the currently used SPS (resource allocation or transport block size and the like described in 3GPP TS 36.213 v13.0.0, "Evolved Universal Terrestrial Radio Access (E-UTRA); Physical layer procedures") in accordance with the change in the uplink bitrate by the EUTRA-CMR. This change may be made by performing SPS activation following SPS release described in 3GPP TS 36.213 v13.0.0, "Evolved Universal Terrestrial Radio Access (E-UTRA); Physical layer procedures," or by defining new signaling for a change such as SPS modification and performing the SPS modification. When raising the uplink bitrate by the EUTRA-CMR, the eNB may make this change in the settings of the SPS before receiving Acknowledgement from the UE, that is, at the same time as or immediately after transmitting the EUTRA-CMR. On the other hand, when lowering the uplink bitrate by the EUTRA-CMR, the eNB may make this change in the settings of the SPS after receiving Acknowledgement from the UE.

In this way, the eNB can instruct the UE to switch the codec mode by using the EUTRA-CMR (designate actual bitrate) in accordance with variation of the radio condition (congestion) of the E-UTRANs 120, 122 or the radio condition (quality loss and quality improvement) of the UE. This allows the UE to make a call with a codec mode (bitrate) appropriate for its radio environment.

Note that the CMR describing method of the EUTRA-CMR may be based on a CMR describing method described in 3GPP TS 26.445 v13.0.0, "Codec for Enhanced Voice Services (EVS); Detailed algorithmic description" for the case of the EVS codec while it may be based on a CMR describing method described in IETF RFC 4867, "RTP Payload Format and File Storage Format for the Adaptive Multi-Rate (AMR) and Adaptive Multi-Rate Wideband (AMR-WB) Audio Codecs" for the case of the AMR-WB or the AMR, and otherwise it may be another describing method. Instead of describing a specific codec mode in the EUTRA-CMR, descriptions such as lowering the bitrate for one level and raising the bitrate for one level may be set in the EUTRA-CMR.

The policy of the operator may determine which one has priority when there is a competition between the EUTRA-CMR and a CMR using a conventional RTP payload format or an RTCP-APP. However, in the case of the EVS codec, the CMR using the conventional RTP payload format or the RTCP-APP has priority for switching between an EVS primary mode and an EVS AMR-WB compatible mode.

Note that, when the CMR using the RTP payload format or the RTCP-APP causes the switching between the EVS primary mode and the EVS AMR-WB compatible mode while using the EVS codec, the codec mode notification unit 607 of the UE notifies the codec mode acquisition unit 705 of the eNB of information indicating a negotiated codec mode (e.g., negotiated bitrate range) in the switched mode (EVS primary mode or EVS AMR-WB compatible mode).

Regardless of the currently used codec, when the IMS signaling message causes re-negotiation of the codec and the codec to be used is switched, the codec mode notification unit 607 of the UE may notify the codec mode acquisition unit 705 of the eNB of information indicating the negotiated codec mode (e.g., negotiated bitrate range) in the switched codec, or, as described above, the codec mode acquisition unit 705 of the eNB may acquire the re-negotiated codec mode from the signaling for establishing the bearer from the P-CSCFs 1, 2 by way of the EPCs 124, 126.

So far, the method of switching the codec mode (bitrate) using the EUTRA-CMR by the eNB has been described.

As described above, in this embodiment, the UEs 100, 102 select the policy of the operator in accordance with change in the radio environment of the UE (at roaming or variation of radio condition). The eNBs 104, 106 instruct the UEs 100, 102 to change the bitrate in accordance with the radio conditions of the UEs 100, 102. In this way, according to this embodiment, the eNBs 104, 106 can switch the codec or the codec mode in accordance with the radio environment of the UE.

Thus, since the UEs 100, 102 can start to talk based on the appropriate policy of the operator and the codec mode, the efficiency of radio resource usage can be improved while reducing deterioration of the speech quality of the UEs 100, 102.

In this embodiment, although the EUTRA-CMR is described as a CMR for the transmitting side (uplink), an EUTRA-CMR for the receiving side (downlink) may be additionally prepared. The UEs 100, 102 receiving the EUTRA-CMR for the receiving side reflect the contents of the EUTRA-CMR for the receiving side in the CMR of the RTP payload header or the RTCP-APP and transmit them to the called party UE.

In this embodiment, the eNBs 104, 106 may notify the UEs 100, 102 of that the eNBs 104, 106 support the codec mode switching using the EUTRA-CMR. For example, broadcast signaling such as the SIB may be used for this notification. For example, based on the notification from multiple eNBs, the UEs 100, 102 may be connected to the eNBs 104, 106 supporting the EUTRA-CMR in priority to others.

(Embodiment 2)

Embodiment 2 of the present disclosure is described in detail with reference to FIG. 6 and FIGS. 15 to 19.

[Configuration of Terminal]

FIG. 6 is a block diagram that illustrates a configuration of a terminal (UEs 100, 102) according to Embodiment 2. Note that FIG. 6 illustrates only a constituent closely related to the present disclosure and a known function of the UE is omitted.

In the UEs 100, 102 illustrated in FIG. 6, the radio reception unit 600 receives signaling or data transmitted from the base stations (eNBs 104, 106) or the MME and outputs the received signaling or data to a corresponding constituent of the UEs 100, 102. The radio transmission unit

601 transmits signaling or data inputted from each constituent to the eNBs 104, 106 or the MME.

As with Embodiment 1, the policy list storage unit 602 stores at least one policy of each of multiple operators, the policy including a codec mode supported by each operator (e.g., see FIGS. 8A and 8B). The policy lists of the operators stored in the policy list storage unit 602 may only be a policy list of one operator under contract with the user using the host terminal (UEs 100, 102) and a policy list of the other operator under roaming contract with the one operator. The policy lists may be preset at shipping of the terminal (UEs 100, 102) or may be acquired by downloading from a server retained by the operator, for example. The policy lists may be acquired by open mobile alliance-device management (OMA-DM) and the like. The policy lists may include an Access Point Name (APN) for the VoLTE service of each operator. These policy lists may include information indicating whether the network of the operator supports the EUTRA-CMR or the ECN.

The operator determination unit 603 in FIG. 6 determines a connection target operator for the UEs 100, 102. For example, the operator determination unit 603 uses the Public Land Mobile Network (PLMN) ID described in "Evolved Universal Terrestrial Radio Access (E-UTRA) and Evolved Universal Terrestrial Radio Access Network (E-UTRAN); Overall description; Stage 2" to determine the connection target operator for the UEs 100, 102.

Note that, when the eNBs 104, 106 are connected to the MMEs of multiple operators, the operator determination unit 603 determines which MMEs of the operators are connected to the eNBs 104, 106 in, for example, the Attach Procedure described in 3GPP TS 23.401 v13.5.0, "General Packet Radio Service (GPRS) enhancements for Evolved Universal Terrestrial Radio Access Network (E-UTRAN) access." When there are multiple candidates for the connection target operators, the operator determination unit 603 may select a preferable connection target operator such as an operator under roaming contract or an operator having higher priority among the operators under roaming contract.

From the eNBs or the MME, the index reception unit 604 receives one or more policy indexes indicating the policy to be used in the connection target operator for UEs 100, 102. Note that, every time the policy to be used in the connection target operator for the UEs 100, 102 is changed in the eNBs 104, 106, the index reception unit 604 receives the policy index indicating the changed policy.

The SDP creation unit 605 uses the information acquired from the policy list storage unit 602, the operator determination unit 603, and the index reception unit 604 to create the SDP offer or the SDP answer and negotiates a mechanism to be used in a call. That is, the SDP creation unit 605 creates the SDP offer or the SDP answer by selectively using one of the policies stored in the policy list storage unit 602 according to the policy index received by the index reception unit 604, the used policy being the policy used in the operator which the operator determination unit 603 determines as a connection target operator for the UEs 100, 102, and negotiates the call between the host terminal and the terminal that is to communicate with the host terminal.

In addition, the SDP creation unit 605 may apply a parameter indicating that the UEs 100, 102 support the function disclosed in this embodiment (later-described codec mode switching using the EUTRA-CMR) to the SDP offer or the SDP answer to negotiate the use of the EUTRA-CMR.

The capability notification unit 606 notifies the eNBs or the MME of information indicating that the UEs 100, 102 support the codec mode switching using the EUTRA-CMR (capability information). When there are multiple methods for the EUTRA-CMR, the capability notification unit 606 may notify the eNBs or the MME of the information indicating a corresponding method. In addition to the information indicating that the UEs 100, 102 support the codec mode switching using the EUTRA-CMR, the capability notification unit 606 may notify the eNBs or the MME of information indicating whether the UEs 100, 102 support the codec mode switching using the ECN.

Out of the mechanisms negotiated by the SDP creation unit 605, the codec mode notification unit 607 notifies the eNBs of information on the codec mode (bitrate, audio band, and the like). With this information, at this point, the codec mode notification unit 607 may notify the eNBs of information on the negotiated codec. In addition, when the codec mode switching using the EUTRA-CMR is selected in the negotiation of a call, the codec mode notification unit 607 notifies the eNBs 104, 106 of information on the negotiated bitrate (e.g., information on a mode-set parameter described in IETF RFC 4867, "RTP Payload Format and File Storage Format for the Adaptive Multi-Rate (AMR) and Adaptive Multi-Rate Wideband (AMR-WB) Audio Codecs" for the case of the AMR or the AMR-WB, and information on br or br-send and br-recv parameter described in 3GPP TS 26.445 v13.0.0, "Codec for Enhanced Voice Services (EVS); Detailed algorithmic description" for the case of the EVS). Also when the codec mode switching using the ECN is selected in the negotiation of a call, the codec mode notification unit 607 may notify the eNBs 104, 106 of the information on the negotiated bitrate.

When the terminal (UEs 100, 102) retains information on the codec mode used for the codec mode switching (e.g., when retaining Media Adaptation Management Object and the like described in 3GPP TS 26.114 v13.2.0, "IP Multimedia Subsystem (IMS); Multimedia Telephony; Media handling and interaction"), the codec mode notification unit 607 may compare the information on the codec mode used for this codec mode switching and the information on the codec mode in the negotiated mechanism to notify the eNB of a common codec mode.

Instead of notifying the eNB of a codec-specific codec mode (bitrate, audio band, and the like), the codec mode notification unit 607 may provide levels for a range of the data size, allow the correspondence of the data size range and the index to be shared between the UE and the eNB in advance, and then notify the eNB of that index. In this embodiment, "data size" is a bitrate including the RTP payload header or padding. The information indicating the correspondence of the data size range and the index (correspondence table) may be preset in the UE and the eNB or may be downloaded from a server by the OMA-DM and the like.

FIG. 15 is an example of the correspondence table of the data size range and the index. Note that, in this embodiment, instead of using new correspondence of the data size range and the index, the existing correspondence of the data size (buffer size) range and the index used for the Buffer Status Report (BSR) described in 3GPP TS 36.321 v13.0.0, "Evolved Universal Terrestrial Radio Access (E-UTRA); Medium Access Control (MAC) protocol specification" may be used. In addition, instead of the data size range, a Transport Block Size (TBS) described in 3GPP TS 36.213 v13.0.0, "Evolved Universal Terrestrial Radio Access (E-UTRA); Physical layer procedures" may be used. Since the codec mode notification unit 607 notifies the eNB of only the index, the data amount required for notifying the eNB can be reduced.

Instead of notifying the eNB of the codec-specific codec mode or the index in association with the data size, the codec mode notification unit 607 may notify the eNB of information indicating the upper limit, the lower limit, and how many bitrate or data size is included between the upper and lower limits of the bitrate or the data size. However, the eNB may not be notified of the information on the upper limit of the bitrate or the data size since the eNB can obtain it from a value of Guaranteed BitRate (GBR) or Maximum BitRate (MBR) described in 3GPP TS 23.401 v13.5.0, "General Packet Radio Service (GPRS) enhancements for Evolved Universal Terrestrial Radio Access Network (E-UTRAN) access" and the like. The upper and lower limits of the bitrate or the data size may be a specific value and may be an index associated with the value or the data size range.

When there is information on the codec mode switching among the mechanisms negotiated by the SDP creation unit 605, the codec mode notification unit 607 also notifies the eNB of this information. For example, in the AMR or the AMR-WB, when mode-change-period, mode-change-capability, mode-change-neighbor, and the like described in IETF RFC 4867, "RTP Payload Format and File Storage Format for the Adaptive Multi-Rate (AMR) and Adaptive Multi-Rate Wideband (AMR-WB) Audio Codecs" are negotiated and there is restriction for a cycle in which the codec mode (bitrate) can be changed or for a range in which the codec mode can be changed (whether it is limited to be changed to next higher bitrate or to next lower bitrate), the codec mode notification unit 607 also notifies the eNB of the information on this restriction. In the EVS, when a cmr parameter described in 3GPP TS 26.445 v13.0.0, "Codec for Enhanced Voice Services (EVS); Detailed algorithmic description" is negotiated, the codec mode notification unit 607 also notifies the eNB of information indicating whether to permit the CMR of the RTP payload. The codec mode notification unit 607 may notify the eNB of the information on a negotiated RTP payload format.

The EUTRA-CMR reception unit 608 receives the EUTRA-CMR from the eNBs 104, 106. The EUTRA-CMR includes a codec mode that is determined by the eNBs 104, 106 in accordance with a radio condition of the UEs 100, 102 (switching codec mode; e.g., bitrate and index representing above-described data size). The EUTRA-CMR is a CMR using Layer2 or Layer3 of the E-UTRANs 120, 122 (described in 3GPP TS 36.300 v13.2.0, "Evolved Universal Terrestrial Radio Access (E-UTRA) and Evolved Universal Terrestrial Radio Access Network (E-UTRAN); Overall description; Stage 2"). However, in this embodiment, instead of designating a specific codec mode (bitrate, bandwidth, and the like) like the AMR, the AMR-WB, and the EVS, the EUTRA-CMR may designate the data size range or an index representing the data size range as described above.

For example, the EUTRA-CMR may use the MAC Control Element (CE) (Layer2) described in 3GPP TS 36.321 v13.0.0, "Evolved Universal Terrestrial Radio Access (E-UTRA); Medium Access Control (MAC) protocol specification" and may use the MAC header, the RLC header, the PDCP header (Layer2), and the like described in 3GPP TS 36.321 v13.0.0, "Evolved Universal Terrestrial Radio Access (E-UTRA); Medium Access Control (MAC) protocol specification" or "Evolved Universal Terrestrial Radio Access (E-UTRA) and Evolved Universal Terrestrial Radio Access Network (E-UTRAN); Overall description; Stage 2."

Otherwise the EUTRA-CMR may use the RRC signaling (Layer3) described in 3GPP TS 36.331 v13.0.0, "Evolved Universal Terrestrial Radio Access (E-UTRA); Radio Resource Control (RRC); Protocol specification." In addition, the EUTRA-CMR may use a Physical Downlink Control Channel (PDCCH) described in 3GPP TS 36.213 v13.0.0, "Evolved Universal Terrestrial Radio Access (E-UTRA); Physical layer procedures" and the like. Thus, when transmitting the EUTRA-CMR, it is possible to avoid an effect on a compression rate of the ROHC due to the use of the IP header like the ECN. Note that, in order to reduce the effect on the compression rate of the ROHC when using the ECN, instead of including congestion notification in the IP header (ECN-CE: ECN Congestion Experienced) into an IP header information part within the ROHC, a new field for the ECN congestion notification may be provided in the PDCP header and the like.

The mode switching notification unit 609 notifies an encoder (not illustrated) of switching to a switching target codec mode included in the EUTRA-CMR received by the EUTRA-CMR reception unit 608 to instruct the encoder to switch the codec mode. When the EUTRA-CMR designates the data size range or the index representing the data size range as described above, the mode switching notification unit 609 specifies a bitrate of the currently used codec corresponding to that data size and notifies the encoder (not illustrated) of the bitrate.

The mode switching acknowledgement unit 610 transmits the response message (acknowledgement) to the eNBs 104, 106 when acknowledging that the encoder switches the codec mode according to the EUTRA-CMR. The Buffer Status Report (BSR) described in 3GPP TS 36.321 v13.0.0, "Evolved Universal Terrestrial Radio Access (E-UTRA); Medium Access Control (MAC) protocol specification" or another MAC CE may be used for transmitting the response message. Otherwise, the RRC signaling described in 3GPP TS 36.331 v13.0.0, "Evolved Universal Terrestrial Radio Access (E-UTRA); Radio Resource Control (RRC); Protocol specification" may be used for transmitting the response message. Note that, also when the UEs 100, 102 receive the CMR using the conventional RTP payload format or the RTCP-APP and the codec mode is switched according to the CMR, the mode switching acknowledgement unit 610 may send a notification message to the eNBs 104, 106. Note that the response message for the codec mode switching using the EUTRA-CMR and the codec mode switching notification by the CMR using the conventional RTP payload format or the RTCP-APP may be either the same signaling or different signaling.

[Configuration of Base Station]

FIG. 16 is a block diagram that illustrates a configuration of the base station (eNBs 104, 106) according to this embodiment. Note that FIG. 16 illustrates only a constituent closely related to the present disclosure and a known function of the eNB is omitted. In FIG. 16, a constituent performing similar processing as that of Embodiment 1 (FIG. 7) is denoted by the same reference sign. The eNBs 104, 106 illustrated in FIG. 16 are additionally provided with a bearer QoS update unit 1501.

In the eNBs 104, 106 illustrated in FIG. 16, the reception unit 700 receives signaling or data transmitted from the UEs 100, 102, the MME, or the S-GW, and outputs the received signaling or data to a corresponding constituent of the eNBs 104, 106. The transmission unit 701 transmits the signaling or the data inputted from each constituent to the UEs 100, 102, the MME, or the S-GW.

The radio condition detection unit 702 detects congestion of the radio access network, a state of congestion alleviation, or a state of the radio environment of each UE. For example, the radio condition detection unit 702 may detect a state of the radio environment of each UE from the Power Headroom Report (PHR) described in 3GPP TS 36.321 v13.0.0, "Evolved Universal Terrestrial Radio Access (E-UTRA); Medium Access Control (MAC) protocol specification" or from the measurement report described in 3GPP TS 36.331 v13.0.0, "Evolved Universal Terrestrial Radio Access (E-UTRA); Radio Resource Control (RRC); Protocol specification." In accordance with the detected state of the radio environment of each UE, the radio condition detection unit 702 determines whether to change the codec mode of the UE using the EUTRA-CMR or to process handover of the UE to another eNB or a base station of a network other than the LTE such as the UMTSTerrestrial Radio Access Network (UTRAN) or the GSM EDGE Radio Access Network (GERAN). In this determination, the radio condition detection unit 702 may take account of the codec mode currently used by the UE.

Based on a default policy index that each operator has and congestion of the radio access network, a state of congestion alleviation or a state of the radio environment of each UE detected by the radio condition detection unit 702, the policy index determination unit 703 determines a policy index for each of the UEs 100, 102 and notifies the respective UEs 100, 102 of the determined policy index. Every time the policy index for the respective UEs 100, 102 is changed because of the change in the radio condition detected by the radio condition detection unit 702, the policy index determination unit 703 may notify the UEs 100, 102 of the changed policy index. Note that a threshold of the state of the radio environment in accordance with the determination of the policy index may be retained by each eNB as a preset or may be downloaded from a server with a method such as the OMA-DM.

The UE capability acquisition unit 704 inquires of the UEs 100, 102 whether the UEs 100, 102 support the codec mode switching using the EUTRA-CMR, and acquires capability information indicating that the UEs 100, 102 support the codec mode switching using the EUTRA-CMR from the UEs 100, 102. Instead of inquiring of the UEs 100, 102, the UE capability acquisition unit 704 may acquire the capability information on the UEs 100, 102 from the MME. Note that, when there are multiple methods for the EUTRA-CMR, the UE capability acquisition unit 704 may acquire a corresponding method from the UEs 100, 102. The UE capability acquisition unit 704 may acquire information indicating whether the UEs 100, 102 support the codec mode switching using the ECN from the UEs 100, 102.

The codec mode acquisition unit 705 acquires information on the codec mode negotiated by the UEs 100, 102 starting to talk (e.g., negotiated bitrate range) from the UEs 100, 102. The codec mode acquisition unit 705 may acquire the negotiated codec mode information from the UEs 100, 102 supporting the EUTRA-CMR or may acquire it from a node on the EPC side.

As described above, instead of acquiring the codec-specific codec mode (bitrate, audio band, and the like), the codec mode acquisition unit 705 may provide levels for a range of the data size (bitrate including RTP payload header and padding), allow the correspondence of the data size range and the index to be shared between the UE and the eNB in advance, and then acquire that index. The correspondence table of the data size range and the index (e.g., see FIG. 15) may be preset in the UE and the eNB or may be downloaded from a server by the OMA-DM and the like. Instead of acquiring the codec-specific codec more or the index associated with the data size range, the codec mode acquisition unit 705 may acquire information indicating the upper limit, the lower limit, and how many bitrate or data size is included between the upper and lower limits of the bitrate or the data size. The codec mode acquisition unit 705 may use the acquired information on the codec mode not only for the codec mode (bitrate) change using the EUTRA-CMR of this embodiment but also for the codec mode (bitrate) change using the ECN.

The codec mode acquisition unit 705 may acquire information on the codec mode switching. For example, when there is restriction for a cycle in which the codec mode (bitrate) can be changed, or for a range in which the codec mode can be changed (whether it is limited to be changed to next higher bitrate or to next lower bitrate), or for using the CMR by the RTP payload, the codec mode acquisition unit 705 also acquires the information on this restriction. The codec mode acquisition unit 705 may also acquire the information on the negotiated RTP payload format.

The EUTRA-CMR transmission unit 706 determines the codec mode to be used by the UEs 100, 102 in accordance with congestion of the radio access network detected by the radio condition detection unit 702 or a radio condition of the UEs 100, 102 supporting the EUTRA-CMR, and transmits the EUTRA-CMR including the determined codec mode to the UEs 100, 102 supporting the EUTRA-CMR. Note that the EUTRA-CMR transmission unit 706 determines the codec mode to be included in the EUTRA-CMR based on the codec mode information acquired by the codec mode acquisition unit 705 (negotiated bitrate range, above-described index representing data size range, above-described information on codec mode switching, and the like). However, in this embodiment, instead of designating a specific codec mode (bitrate, bandwidth, and the like) like the AMR, the AMR-WB, and the EVS, the EUTRA-CMR may designate the data size range or the index representing the data size range as described above (e.g., see FIG. 15).

From the UEs 100, 102 as the transmission destination of the EUTRA-CMR, the mode switching acknowledgement reception unit 707 receives the response message (acknowledgement) indicating completion of switching to the codec mode included in the EUTRA-CMR. Even when the UEs 100, 102 receive the CMR using the conventional RTP payload format or the RTCP-APP and switch the codec mode according to the CMR, the mode switching acknowledgement reception unit 707 may send a notification message from the UEs 100, 102.

When the upper limit of the codec mode (bitrate) is switched by the EUTRA-CMR, or the CMR using the conventional RTP payload format or the RTCP-APP, or the ECN, the bearer QoS update unit 1501 transmits signaling to the MME to change a guaranteed bandwidth of a talk-dedicated bearer (Guaranteed Bitrate (GBR); described in 3GPP TS 23.401 v13.5.0, "General Packet Radio Service (GPRS) enhancements for Evolved Universal Terrestrial Radio Access Network (E-UTRAN) access" and the like). Note that, when codec modes of the multiple UEs subordinated by the eNB are changed at once (e.g., when the EUTRA-CMRs are sent to the multiple UEs at once), the bearer QoS update unit 1501 may transmit signaling for the MME for only one time or limited number of times to change the guaranteed bandwidth of the talk-dedicated bearer of the multiple UEs. In order to transmit signaling for the MME for only one time or limited number of times and change the guaranteed bandwidth of the talk-dedicated bearer of the multiple UEs, the eNB uses signaling transmitted to the MME to transmit information on the dedicated bearer for the multiple UEs concerned (Tunnel Endpoint Identifier (TEID) and the like; described in 3GPP TS 23.401 v13.5.0, "General Packet Radio Service (GPRS) enhancements for Evolved Universal Terrestrial Radio Access Network (E-UTRAN) access") and the GMR at once.

Note that, hereinafter, the UEs 100, 102 that support the codec mode switching using the EUTRA-CMR may be mentioned merely as "UE" in some cases. Also, hereinafter, the eNBs 104, 106 illustrated in FIG. 16 may be mentioned merely as "eNB" in some cases.

In this embodiment, the policy index notification method and the capability information notification method are similar to those of Embodiment 1; thus, descriptions thereof are omitted.

[Negotiated Codec Mode Notification Method]

Next, an example of a notification method of a codec mode negotiated between the UEs starting to talk is described in detail with reference to FIGS. 17A and 17B. Here, an index notification method using the correspondence table of the data size range and the index (e.g., see FIG. 15) in this embodiment is described.

Figure 17A:
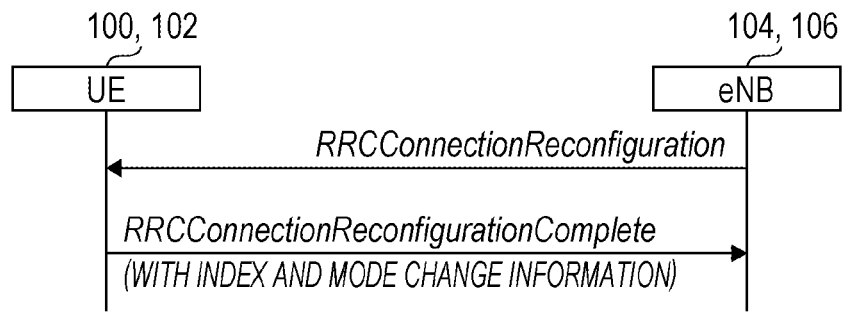
FIG. 17A is a diagram that illustrates an example of a negotiated codec mode notification method according to Embodiment 2 of the present disclosure.

In FIG. 17A, the codec mode notification unit 607 of the UE uses the RRC dedicated signaling (e.g., RRCConnectionReconfigurationComplete) to notify the codec mode acquisition unit 705 of the eNB of an index corresponding to the negotiated codec mode. For example, when the index corresponding to the data size of the negotiated codec mode is 1,2,3, the codec mode notification unit 607 may make notification by setting the index as "1,2,3" to a field of the data size permitted for the mode change, and may make notification by setting the index range as "1-3." In FIG. 17A, although a method using RRCConnectionReconfigurationComplete for the RRCConnectionReconfiguration described in 3GPP TS 36.331 v13.0.0, "Evolved Universal Terrestrial Radio Access (E-UTRA); Radio Resource Control (RRC); Protocol specification" is illustrated as an example of the RRC dedicated signaling; however, other RRC dedicated signaling may be used.

The codec mode notification unit 607 may notify of the above-described information on the codec mode change (mode change information) with the index. For example, when the cycle in which the codec mode can be changed is 40 msec, the codec mode notification unit 607 may store a value "40" or an index corresponding to 40 msec in a field indicating the cycle of the codec mode change, and transmit it. When only adjacent bitrates (in this example, indexes) are permitted to be changed in one EUTRA-CMR, the codec mode notification unit 607 may store a value indicating that only the adjacent bitrates are permitted to be changed (e.g., "1") into a field indicating whether to permit only the adjacent bitrates to be changed, and transmit it.

When the SDP creation unit 605 of the UE adds the parameter indicating that the UE supports the EUTRA-CMR to the SDP offer or the SDP answer for negotiation and then this negotiation is failed, the codec mode notification unit 607 may not notify the eNB of the codec mode but notify the eNB of the fail of negotiation. Note that the codec mode notification unit 607 may notify the eNB of information on the ECN in addition to or instead of the information on the EUTRA-CMR. The information on the ECN is, for example, information indicating whether the use of the ECN is negotiated by the SDP offer and answer, or information indicating a range of the negotiated codec mode (bitrate).

Figure 17B:
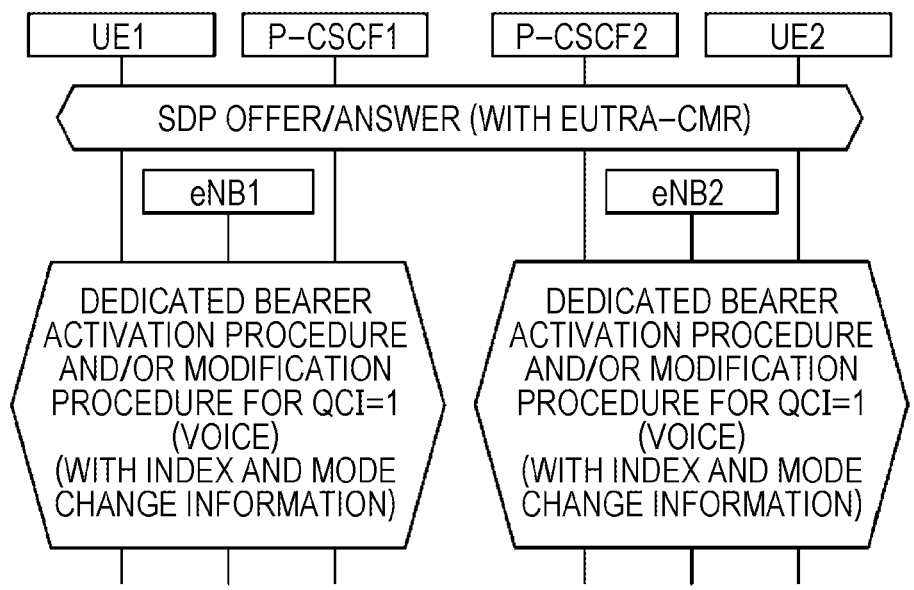
FIG. 17B is a diagram that illustrates an example of the negotiated codec mode notification method according to Embodiment 2 of the present disclosure.

FIG. 17B notifies the codec mode acquisition unit 705 of the eNB of the index from the IMS network 128 and the EPCs 124, 126 side. The IMS network 128 and the EPCs 124, 126 side may also notify information on the above-described codec mode change with the index.

In specific, the P-CSCF 1,2, which are nodes for relaying the SDP offer and answer of the UEs 1, 2 starting to talk, check the negotiated codec mode. At this point, the P-CSCFs 1, 2 may check the SDP parameter (eutra-cmr) indicating that the UE supports the codec mode switching using the EUTRA-CMR to determine whether the codec mode switching using the EUTRA-CMR is negotiated. Note that the method of notifying the codec mode acquisition unit 705 of the eNB of an index from the IMS network 128 and the EPCs 124, 126 side of FIG. 17B may also be used when the ECN is negotiated.

The P-CSCFs 1, 2 notify the PCRF of the EPCs 124, 126 of an index corresponding to the negotiated codec mode, the PCRF then transmits the acquired index to the P-GW, and the P-GW includes the index as a parameter in the signaling for establishing a bearer for call. The codec mode acquisition unit 705 of the eNB receives this signaling to acquire the index corresponding to the negotiated codec mode.

In this way, since the UE notifies the eNB of the index corresponding to the negotiated codec mode, the eNB can specify in advance a range of the index corresponding to the codec mode (bitrate) that is designated by the EUTRA-CMR.

Before performing the codec mode switching using the EUTRA-CMR, the UE negotiates use of the codec mode switching using the EUTRA-CMR with the called party, and when both the UEs reach an agreement, the UE notifies the eNB of the index corresponding to the negotiated codec mode. The eNB thus can use the index corresponding to the bitrate negotiated between the talking UEs to make an instruction to switch the codec mode using the EUTRA-CMR.

[Codec Mode Switching Method Using EUTRA-CMR]

Next, an example of the method of switching the codec mode (bitrate) using the EUTRA-CMR by the eNB is described in detail with reference to FIGS. 18A, 18B, and 19.

For example, it is assumed that there are conditions for the negotiated codec and codec mode, that is, the EVS, the bitrate is between 9.6 kbps and 24.4 kbps, there is no designation to use only a header full RTP payload format (described in 3GPP TS 26.445 v13.0.0, "Codec for Enhanced Voice Services (EVS); Detailed algorithmic description") (hf-only=0 or no parameter of hf-only), the audio band is the SWB, and the Channel Aware mode is not used.

Figures 18A, 18B:
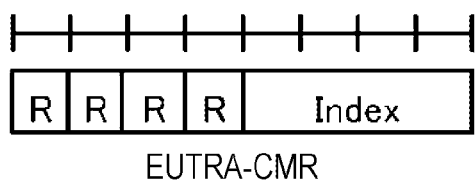
FIG. 18A is a diagram that illustrates an example of an LCID value when a MAC CE is used for an EUTRA-CMR according to Embodiment 2 of the present disclosure.
FIG. 18B is a diagram that illustrates an example of a configuration of the MAC CE when the MAC CE is used for the EUTRA-CMR according to Embodiment 2 of the present disclosure.

FIG. 18A illustrates an example of the MAC CE when the MAC CE described in 3GPP TS 36.321 v13.0.0, "Evolved Universal Terrestrial Radio Access (E-UTRA); Medium Access Control (MAC) protocol specification" is used for the EUTRA CMR.

FIG. 18B illustrates an example of a case where one of the reserved values (Reserved) of the Logical Channel Identifier (LCID) of 3GPP TS 36.321 v13.0.0, "Evolved Universal Terrestrial Radio Access (E-UTRA); Medium Access Control (MAC) protocol specification" is defined as the EUTRA-CMR. In FIG. 18A, the LCID value (Index) ="11001" is allocated as the EUTRA-CMR, as an example. FIG. 18B illustrates an example of a configuration of the MAC CE of the EUTRA-CMR. Each R bit indicates that it is reserved. An Index field having four bits is filled with a value of the index illustrated in FIG. 15. This index value means a size of the required data.

Note that the R bit may be used as a bit representing the EUTRA-CMR in the downlink direction that is described later.

Figure 19:
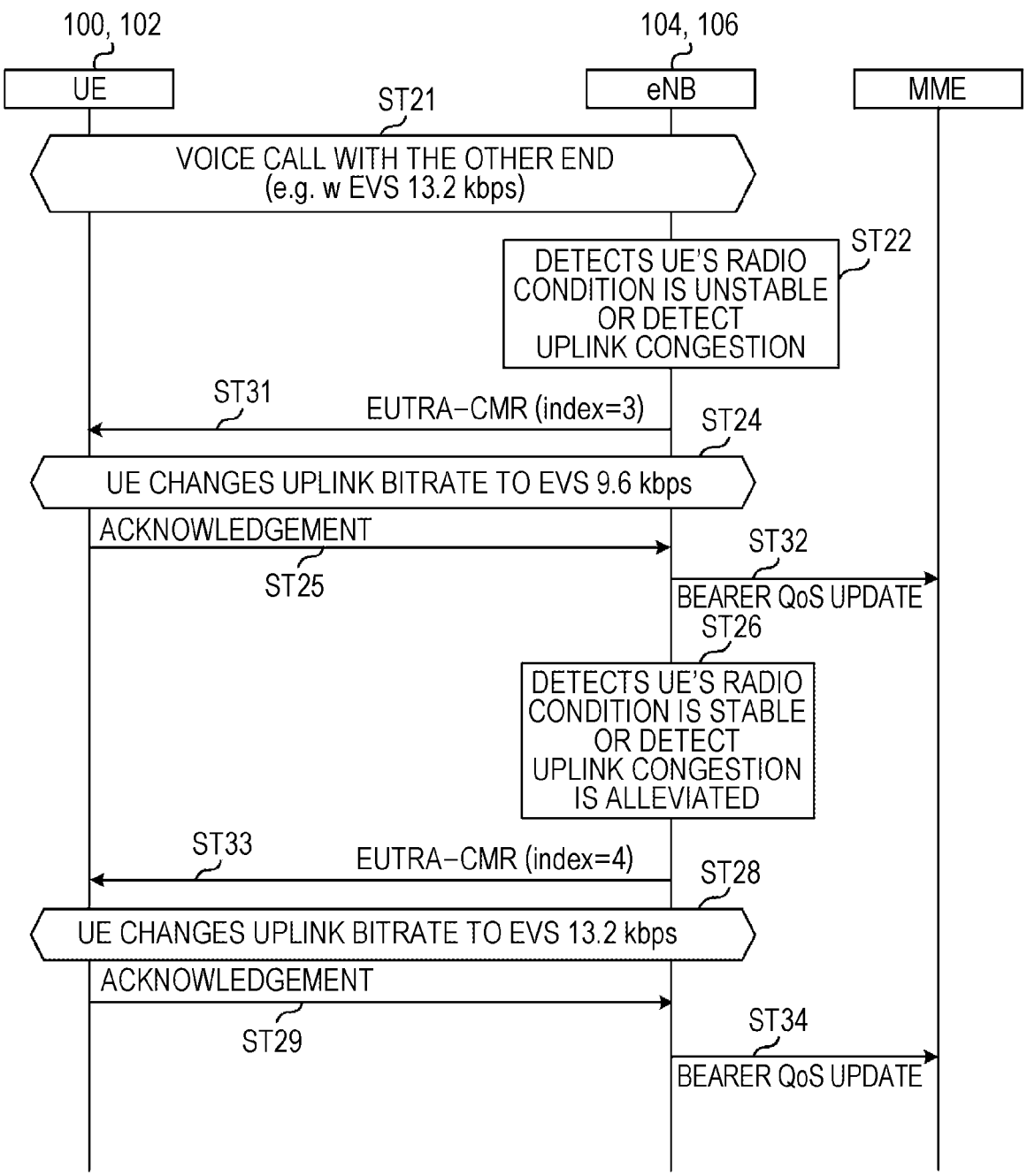
FIG. 19 is a diagram that illustrates an example of bitrate change using the EUTRA-CMR according to Embodiment 2 of the present disclosure.

In FIG. 19, first, the UE encodes with the SWB of the EVS codec (hereinafter called as EVS-SWB) at 13.2 kbps and transmits voice data (ST21). At this point, a data size of per frame of a compact RTP payload format of EVS codec 13.2 kbps (described in 3GPP TS 26.445 v13.0.0, "Codec for Enhanced Voice Services (EVS); Detailed algorithmic description") is 264 bits. The eNB thus identifies that a data size of index=4 is currently used (data size range: between 193 and 264 bits; see FIG. 15).

Next, the radio condition detection unit 702 of the eNB detects that the radio environment of the UE is unstable or that the E-UTRAN (uplink) is congested (ST22). The radio condition detection unit 702 of the eNB thus instructs the EUTRA-CMR transmission unit 706 of the eNB to use the EUTRA-CMR to lower the bitrate to be used for transmission of the UE (not illustrated). The EUTRA-CMR transmission unit 706 of the eNB determines to make an instruction to make the bitrate to be used for transmission of the UE one level lower, designates index=3 (data size range: between 161 and 192 bits; see FIG. 15) as the EUTRA-CMR, and transmits it to the UE (ST31). At this point, instead of instructing the EUTRA-CMR transmission unit 706 of the eNB to lower the bitrate used for transmission of the UE by the EUTRA-CMR, the radio condition detection unit 702 of the eNB may determine to handover the UE to another eNB or a base station of a network other than the LTE such as the UTRAN or the GERAN (not illustrated).

The EUTRA-CMR reception unit 608 of the UE receives the EUTRA-CMR and outputs to the mode switching notification unit 609 that index=3 is designated. The mode switching notification unit 609 specifies that EVS-SWB 9.6 kbps is designated, based on that the codec currently used is the EVS, the use of the SWB audio band is negotiated, and index=3 is designated by the EUTRA-CMR (data size of per frame of the compact RTP payload format of EVS codec 9.6 kbps is 192 bits). The mode switching notification unit 609 then instructs the EVS encoder (not illustrated) of the UE to encode at EVS-SWB 9.6 kbps. The EVS encoder of the UE receives the instruction on EVS-SWB 9.6 kbps and then changes the bitrate to EVS-SWB 9.6 kbps to start encoding (ST24). Once acknowledging that the EVS encoder switches the bitrate to EVS-SWB 9.6 kbps, the mode switching acknowledgement unit 610 of the UE transmits Acknowledgement to the eNB (ST25).

By receiving Acknowledgement, the mode switching acknowledgement reception unit 707 of the eNB detects that the codec mode of the voice data transmitted from the UE is switched as instructed. At this point, the bearer QoS update unit 1501 of the eNB may transmit signaling (Bearer QoS update) to the MME to induce to change the GBR of the call-dedicated bearer of the UE with the switched codec mode (ST32).

Next, the radio condition detection unit 702 of the eNB detects that the radio environment of the UE is improved or the congestion of the E-UTRAN (uplink) is alleviated (ST26). The EUTRA-CMR transmission unit 706 of the eNB determines to make an instruction to make the bitrate to be used for transmission of the UE one level higher again, designates index=4 as the EUTRA-CMR, and transmits it to the UE (ST33).

The EUTRA-CMR reception unit 608 of the UE receives the EUTRA-CMR and outputs to the mode switching notification unit 609 that index=4 is designated. The mode switching notification unit 609 specifies that EVS-SWB 13.2 kbps is designated, based on that the codec currently used is the EVS, the use of the SWB audio band is negotiated, and index=4 is designated by the EUTRA-CMR. The mode switching notification unit 609 then instructs the EVS encoder (not illustrated) of the UE to encode at EVS-SWB 13.2 kbps. The EVS encoder of the UE receives the instruction on EVS-SWB 13.2 kbps and then changes the bitrate to EVS-SWB 13.2 kbps to start encoding (ST28). Once acknowledging that the EVS encoder switches the bitrate to EVS-SWB 13.2 kbps, the mode switching acknowledgement unit 610 of the UE transmits Acknowledgement to the eNB (ST29).

By receiving Acknowledgement, the mode switching acknowledgement reception unit 707 of the eNB detects that the codec mode of the voice data transmitted from the UE is switched as instructed. At this point, the bearer QoS update unit 1501 of the eNB may transmit signaling to the MME to induce to change the GBR of the call-dedicated bearer of the UE with the switched codec mode (ST34).

Note that, when the Semi-Persistent Scheduling (SPS) described in 3GPP TS 36.213 v13.0.0, "Evolved Universal Terrestrial Radio Access (E-UTRA); Physical layer procedures" and the like is used for the uplink scheduling of the E-UTRAN, the eNB may change the settings of the currently used SPS (resource allocation or transport block size and the like described in 3GPP TS 36.213 v13.0.0, "Evolved Universal Terrestrial Radio Access (E-UTRA); Physical layer procedures") in accordance with the change in uplink bitrate by the EUTRA-CMR. This change may be made by performing the SPS activation following the SPS release described in 3GPP TS 36.213 v13.0.0, "Evolved Universal Terrestrial Radio Access (E-UTRA); Physical layer procedures," or by defining new signaling for a change such as the SPS modification and performing the SPS modification. When raising the uplink bitrate by the EUTRA-CMR, the eNB may make this change in the settings of the SPS before receiving Acknowledgement from the UE, that is, at the same time as or immediately after transmitting the EUTRA-CMR. On the other hand, when lowering the uplink bitrate by the EUTRA-CMR, the eNB may make this change in the settings of the SPS after receiving Acknowledgement from the UE.

In this way, the eNB can instruct the UE to switch the codec mode by using the EUTRA-CMR in accordance with variation of the radio condition (congestion) of the E-UTRANs 120, 122 or the radio condition (quality loss and quality improvement) of the UE. This allows the UE to make a call with a codec mode (bitrate) appropriate for its radio environment.

Note that, when there are multiple candidates for the codec mode switching specified by the index of the EUTRA-CMR, the eNB and the UE may set in advance a codec mode they will switch to. For example, among the multiple switching candidates, the eNB and the UE may set in advance that they will switch to a codec mode having the largest data size or a codec mode having the smallest data size.

The describing method of the index of the EUTRA-CMR may be as described above, and instead of designating the index, descriptions such as making the data size one level lower or making the data size one level higher may be performed by the EUTRA-CMR.

The policy of the operator may determine which one has priority when there is a competition between the EUTRA-CMR and the CMR using the conventional RTP payload format or the RTCP-APP. However, in the case of the EVS codec, the CMR using the conventional RTP payload format or the RTCP-APP has priority for switching between the EVS primary mode and the EVS AMR-WB compatible mode.

Note that, when the CMR using the RTP payload format or the RTCP-APP causes the switching between the EVS primary mode and the EVS AMR-WB compatible mode while using the EVS codec, the codec mode notification unit 607 of the UE notifies the codec mode acquisition unit 705 of the eNB of information indicating the negotiated codec mode (e.g., negotiated bitrate range) in the switched mode (EVS primary mode or EVS AMR-WB compatible mode) and information on the restriction on the codec mode switching.

Regardless of the currently used codec, when the IMS signaling message causes re-negotiation of the codec and the codec to be used is switched, or, when the codec mode (bitrate and audio band) and the like are switched while the codec to be used is still the same, the codec mode notification unit 607 of the UE may notify the codec mode acquisition unit 705 of the eNB of the index corresponding to the negotiated codec mode (e.g., negotiated bitrate range) in the switched codec, or, as described above, the codec mode acquisition unit 705 of the eNB may acquire the re-negotiated codec mode from the signaling for establishing the bearer from the P-CSCFs 1, 2 by way of the EPCs 124, 126.

So far, the method of switching the codec mode (bitrate) using the EUTRA-CMR by the eNB has been described.

As described above, in this embodiment, the UEs 100, 102 select the policy of the operator in accordance with change in the radio environment of the UE (at roaming or variation of radio condition). The eNBs 104, 106 instruct the UEs 100, 102 to change the bitrate in accordance with the radio conditions of the UEs 100, 102. In this way, according to this embodiment, the eNBs 104, 106 can switch the codec or the codec mode in accordance with the radio environment of the UE.

Thus, since the UEs 100, 102 can make a call based on the appropriate policy of the operator and the codec mode, the efficiency of radio resource usage can be improved while reducing deterioration of the speech quality of the UEs 100, 102.

In this embodiment, the eNB and the UE divide the data size corresponding to each codec mode to multiple ranges and retain in advance the correspondence between the data size range and the index. Among the multiple data size ranges, the eNB then notifies the UE of the index associated with a range including the data size of the codec mode to be used by the UE by including the index in the EUTRA-CMR. This allows the eNB to notify the UE of how much level adjustment from the currently used codec mode (bitrate) will be performed. That is, the eNB and the UE can switch the codec mode using the common EUTRA-CMR independent from the codec mode. Also, since the index indicating the data size range is notified by the EUTRA-CMR, the data amount can be smaller than the case where notifying of the codec-specific actual codec mode (bitrate, bitrate range, and the like).

In this embodiment, although the EUTRA-CMR is described as the CMR for the transmitting side (uplink), the EUTRA-CMR for the receiving side (downlink) may be additionally prepared. The UEs 100, 102 receiving the EUTRA-CMR for the receiving side reflect the contents of the EUTRA-CMR for the receiving side in the CMR of the RTP payload header or the RTCP-APP and transmit them to the called party UE.

In this embodiment, the eNBs 104, 106 may notify the UEs 100, 102 of that the eNBs 104, 106 support the codec mode switching using the EUTRA-CMR or the ECN. For example, broadcast signaling such as the SIB may be used for this notification. For example, based on the notification from multiple eNBs, the UEs 100, 102 may be connected to the eNBs 104, 106 supporting the EUTRA-CMR in priority to others.

So far, the embodiments of the present disclosure have been described.

Note that the present disclosure is not limited to the above embodiments and able to be implemented in different variation.

The above embodiments have been described with examples of a voice codec such as the AMR, the AMR-WB, and the EVS; however, the embodiments may adapt to a video codec such as H.264 and H.265 described in 3GPP TS 26.114 v13.2.0, "IP Multimedia Subsystem (IMS); Multimedia Telephony; Media handling and interaction" and the like.

The above embodiments have been described with examples in which an aspect of the present disclosure is configured with hardware; however, the present disclosure can be implemented by software in cooperation with hardware.

Each functional block used in the descriptions of the above embodiments is typically implemented by an LSI such as an integrated circuit having an input terminal and an output terminal. The integrated circuit may control each functional block used in the descriptions of the above embodiments and may be provided with the input and output terminals. The LSI may be individually formed as chips, or one chip may be formed so as to include a part or all of the functional blocks. The LSI here may be referred to as an IC, a system LSI, a super LSI, or an ultra LSI depending on a difference in the degree of integration.

The technique of implementing an integrated circuit is not limited to the LSI and may be implemented by a dedicated circuit or a general-purpose processor. A Field Programmable Gate Array (FPGA) that can be programmed after the manufacture of the LSI or a reconfigurable processor in which the connections and the settings of circuit cells inside the LSI can be reconfigured may be used.

In addition, if future integrated circuit technology replaces LSIs as a result of the advancement of semiconductor technology or other derivative technology, the functional blocks could be integrated using that new technology. Biotechnology can also be added.

A terminal according to the present disclosure includes: a codec mode request reception unit that receives a codec mode request including a codec mode that is determined by a base station in accordance with a radio condition of the terminal; a mode switching notification unit that notifies an encoder of switching to the codec mode included in the received codec mode request; and a mode switching acknowledgement unit that transmits a response message to the base station when acknowledging that the encoder switches the codec mode.

The terminal according to the present disclosure further includes: a storage unit that stores at least one policy of each of a plurality of operators, the policy including a codec mode supported by each operator; an index reception unit that receives a policy index indicating the policy to be used in the connection target operator for the terminal; and an SDP creation unit that selectively uses one of the policies stored in the storage unit according to the received policy index, and negotiates the call between the terminal and another terminal that is to communicate with the terminal.

In the terminal according to the present disclosure, every time the policy to be used in the connection target operator for the terminal is changed in the base station, the index reception unit receives the policy index indicating the changed policy.

In the terminal according to the present disclosure, the codec mode request reception unit receives the codec mode request by using either Layer2 or Layer3 of a radio access network of the base station.

In the terminal according to the present disclosure, the mode switching acknowledgement unit transmits the response message by using either Layer2 or Layer3 of a radio access network of the base station.

In the terminal according to the present disclosure, the SDP creation unit adds a parameter indicating that the terminal supports codec mode switching using the codec mode request from the base station to SDP offer and negotiates the call.

The terminal according to the present disclosure further includes: a codec mode notification unit that notifies the base station of a negotiated bit rate range when the codec mode switching using the codec mode request from the base station for the negotiation of the call.

The terminal according to the present disclosure further includes: a capability notification unit that notifies the base station of capability information indicating that the terminal supports mode switching using the codec mode request from the base station.

In the terminal according to the present disclosure, a plurality of data size ranges and indexes are in association with one-to-one, and the codec mode request includes the index associated with a range including a data size of a codec mode to be used by the terminal.

A base station according to the present disclosure includes: a radio condition detection unit that detects a radio condition of a terminal; a codec mode request transmission unit that determines a codec mode to be used by the terminal in accordance with the radio condition of the terminal and transmits a codec mode request including the determined codec mode to the terminal; and a mode switching acknowledgement reception unit that receives a response message indicating completion of switching to the codec mode included in the received codec mode request.

A codec mode switching method according to the present disclosure includes: receiving a codec mode request including a codec mode that is determined by a base station in accordance with a radio condition of a terminal; notifying an encoder of switching to the codec mode included in the received codec mode request; and transmitting a response message to the base station when acknowledging that the encoder switches the codec mode.

A codec mode switching method according to the present disclosure includes: detecting a radio condition of a terminal; determining a codec mode to be used by the terminal in accordance with the radio condition of the terminal and transmitting a codec mode request including the determined codec mode to the terminal; and receiving a response message indicating completion of switching to the codec mode included in the received codec mode request.

The present disclosure is especially applicable for a radio system and the like that changes a bitrate of a codec in accordance with a radio condition of a UE.

What is claimed is:

1. A terminal, for use in a communication system including a base station, a first set of terminals including the terminal which support a codec mode request message, and a second set of terminals which do not support the codec mode request message, the terminal comprising:
   capability notification circuitry, which, in operation, notifies the base station of capability information indicating that the terminal supports the codec mode request message;
   reception circuitry, which receives, from the base station, in response to the capability information, the codec mode request message including a codec mode that is determined by the base station in accordance with a radio condition of the terminal, wherein the base station sends the codec mode request message only to the first set of terminals in response to the capability information received therefrom, and does not send the codec mode request message to the second set of terminals;
   mode switching notification circuitry, which, in operation, notifies an encoder of switching to the codec mode included in the codec mode request message; and
   mode switching acknowledgement circuitry, which, in operation, transmits a response message to the base station when confirming that the encoder switches the codec mode.

2. The terminal according to claim 1 further comprising:
   a storage, which, in operation, stores at least one policy of each of a plurality of operators, the policy including a codec mode supported by each operator;
   index reception circuitry, which, in operation, receives a policy index indicating the policy to be used in the operator to which the terminal is to connect; and
   SDP (session description protocol) creation circuitry, which, in operation, selectively uses one of the policies stored in the storage according to the received policy index, to negotiate a call between the terminal and another terminal that is to communicate with the terminal.

3. The terminal according to claim 2, wherein
   every time the policy to be used in the operator to which the terminal is to connect is changed to a new policy in the base station, the index reception circuitry receives the policy index indicating the new policy.

4. The terminal according to claim 1, wherein
   the reception circuitry receives the codec mode request message by using either Layer2 or Layer3 of a radio access network of the base station.

5. The terminal according to claim 1, wherein
   the mode switching acknowledgement circuitry transmits the response message by using either Layer2 or Layer3 of a radio access network of the base station.

6. The terminal according to claim 2, wherein
   the SDP creation circuitry negotiates the call by adding a parameter indicating the capability information to an SDP offer.

7. The terminal according to claim 6, further comprising:
   codec mode notification circuitry, which, in operation, notifies the base station of a negotiated bitrate range when the codec mode request message from the base station is used in the negotiation of the call.

8. The terminal according to claim 1, wherein
   a plurality of data size ranges and indexes are associated with each other on a one-to-one basis, and
   the codec mode request message includes the index associated with a range including a data size of the codec mode to be used by the terminal among the plurality of ranges.

9. The terminal according to claim 1, wherein the codec mode request message includes a bitrate recommendation.

10. A base station, for use in a communication system including the base station, a first set of terminals that support a codec mode request message, and a second set of terminals that do not support the codec mode request message, the base station comprising:
- reception circuitry, which, in operation, receives, from a terminal which is one of the first set of terminals, capability information indicating that the terminal supports the codec mode request message;
- radio condition detection circuitry, which, in operation, detects a radio condition of the terminal;
- transmission circuitry, which, in response to the capability information, transmits, to the terminal, the codec mode request message including a codec mode that is determined by the base station in accordance with the radio condition of the terminal, wherein the base station sends the codec mode request message only to the first set of terminals in response to the capability information received therefrom, and does not send the codec mode request message to the second set of terminals; and
- mode switching acknowledgement reception circuitry, which, in operation, receives, from the terminal, a response message indicating completion of switching to the codec mode included in the codec mode request message.

11. The base station according to claim 10, wherein the codec mode request message includes a bitrate recommendation.

12. The base station according to claim 10, wherein
the transmission circuitry transmits the codec mode request message by using either Layer2 or Layer3 of a radio access network of the base station.

13. The base station according to claim 10, wherein
the mode switching acknowledgement reception circuitry receives the response message by using either Layer2 or Layer3 of a radio access network of the base station.

14. The base station according to claim 10 further comprising:
- a storage, which, in operation, stores at least one policy of each of a plurality of operators, the policy including a codec mode supported by each operator; and
- index transmission circuitry, which, in operation, transmits a policy index to the terminal, wherein the policy index indicates the policy to be used in the operator to which the terminal is to connect and the terminal uses the policy according to the policy index to negotiate a call between the terminal and another terminal that is to communicate with the terminal.

15. The base station according to claim 10, wherein
a plurality of data size ranges and indexes are associated with each other on a one-to-one basis, and
the codec mode request message includes the index associated with a range including a data size of the codec mode to be used by the terminal among the plurality of ranges.

16. A codec mode switching method implemented by a terminal used in a communication system including a base station, a first set of terminals including the terminal which support a codec mode request message, and a second set of terminals which do not support the codec mode request message, the codec mode switching method comprising:
- notifying the base station of capability information indicating that the terminal supports the codec mode request message;
- receiving, from the base station in response to the capability information, the codec mode request message including a codec mode that is determined by the base station in accordance with a radio condition of the terminal, wherein the base station sends the codec mode request message only to the first set of terminals in response to the capability information received therefrom, and does not send the codec mode request message to the second set of terminals;
- notifying an encoder of switching to the codec mode included in the codec mode request message; and
- transmitting a response message to the base station when confirming that the encoder switches the codec mode.

17. The codec mode switching method according to claim 16, wherein the codec mode request message includes a bitrate recommendation.

18. A codec mode switching method implemented by a base station used in a communication system including the base station, a first set of terminals that support a codec mode request message, and a second set of terminals that do not support the codec mode request message, the codec mode switching method comprising:
- receiving, from a terminal which is one of the first set of terminals, capability information indicating that the terminal supports the codec mode request message;
- detecting a radio condition of the terminal;
- transmitting, to the terminal in response to the capability information, the codec mode request message including a codec mode that is determined by the base station in accordance with the radio condition of the terminal, wherein the base station sends the codec mode request message only to the first set of terminals in response to the capability information received therefrom, and does not send the codec mode request message to the second set of terminals; and
- receiving, from the terminal, a response message indicating completion of switching to the codec mode included in the codec mode request message.

19. The codec mode switching method according to claim 18, wherein the codec mode request message includes a bitrate recommendation.

* * * * *